United States Patent
Tsai et al.

(10) Patent No.: US 10,887,026 B1
(45) Date of Patent: Jan. 5, 2021

(54) ANTENNA DISCONNECTION DETECTION OF DISTRIBUTED RADIO FREQUENCY PORTS IN A WIRELESS NETWORK

(71) Applicant: Amazon Technologies, Inc., Seattle, WA (US)

(72) Inventors: Kun Ting Tsai, Fremont, CA (US); Nathan Labadie, Gilroy, CA (US); Cheol Su Kim, San Jose, CA (US); Haritha Tamvada, San Jose, CA (US); Omar Fawazhashim Zakaria, Saratoga, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/794,070

(22) Filed: Feb. 18, 2020

(51) Int. Cl.
| | |
|---|---|
| *H04B 17/10* | (2015.01) |
| *H04B 3/52* | (2006.01) |
| *H04B 7/0408* | (2017.01) |
| *H04B 17/318* | (2015.01) |
| *H01Q 13/24* | (2006.01) |
| *H04W 88/08* | (2009.01) |
| *H04B 3/54* | (2006.01) |

(52) U.S. Cl.
CPC .......... *H04B 17/102* (2015.01); *H01Q 13/24* (2013.01); *H04B 3/52* (2013.01); *H04B 3/54* (2013.01); *H04B 7/0408* (2013.01); *H04B 17/318* (2015.01); *H04W 88/085* (2013.01)

(58) Field of Classification Search
None
See application file for complete search history.

(56) References Cited

U.S. PATENT DOCUMENTS

| | | | | |
|---|---|---|---|---|
| 10,574,316 | B1 * | 2/2020 | Ichapurapu | .......... H04W 8/005 |
| 10,616,904 | B1 * | 4/2020 | Mirkamali | .......... H01Q 21/062 |
| 2004/0192222 | A1 * | 9/2004 | Vaisanen | .............. H04B 1/3805 |
| | | | | 455/78 |
| 2007/0135042 | A1 * | 6/2007 | Shiff | ................... H04B 1/1027 |
| | | | | 455/13.3 |
| 2007/0232248 | A1 * | 10/2007 | Kasha | ...................... H04B 1/04 |
| | | | | 455/121 |
| 2009/0262042 | A1 * | 10/2009 | Li | ........................ H04B 1/0064 |
| | | | | 343/876 |
| 2013/0017797 | A1 * | 1/2013 | Ramasamy | .......... H04B 17/382 |
| | | | | 455/226.1 |

(Continued)

*Primary Examiner* — Lana N Le
(74) *Attorney, Agent, or Firm* — Lowenstein Sandler LLP

(57) ABSTRACT

Technologies directed to antenna disconnection detection of distributed radio frequency (RF) ports in a wireless network are described. One method receives data from the wireless devices and generates an RSSI matrix including multiple elements, each storing a receive signal strength indicator (RSSI) value indicative of a signal strength of a wireless link between a transmitter-receiver pair. The method identifies a characteristic pattern in the RSSI matrix. The characteristic pattern includes i) two or more RSSI values in a same row being less than the threshold value and ii) two or more RSSI values in a same column being less than the threshold value. The method stores an indication that an antenna is disconnected from an RF port and sends a command to the second wireless device that causes the second wireless device to disable a radio that is coupled to the RF port.

20 Claims, 17 Drawing Sheets

(56) References Cited

U.S. PATENT DOCUMENTS

| | | | |
|---|---|---|---|
| 2013/0260705 A1* | 10/2013 | Stratford | H04W 24/08 455/226.1 |
| 2013/0322559 A1* | 12/2013 | Kludt | H03G 3/20 375/267 |
| 2016/0381557 A1* | 12/2016 | Deng | H04L 67/04 726/4 |
| 2018/0159639 A1* | 6/2018 | Ning | H04B 17/29 |
| 2018/0331714 A1* | 11/2018 | See | H04B 1/58 |

* cited by examiner

ANTENNA DISCONNECTION DETECTION OF DISTRIBUTED RADIO FREQUENCY PORTS IN A WIRELESS NETWORK

BACKGROUND

A large and growing population of users is enjoying entertainment through the consumption of digital media items, such as music, movies, images, electronic books, and so on. The users employ various electronic devices to consume such media items. Among these electronic devices (referred to herein as endpoint devices, user devices, clients, client devices, or user equipment) are electronic book readers, cellular telephones, Personal Digital Assistants (PDAs), portable media players, tablet computers, netbooks, laptops, and the like. These electronic devices wirelessly communicate with a communications infrastructure to enable the consumption of the digital media items. In order to communicate with other devices wirelessly, these electronic devices include one or more antennas.

BRIEF DESCRIPTION OF DRAWINGS

The present inventions will be understood more fully from the detailed description given below and from the accompanying drawings of various embodiments of the present invention, which, however, should not be taken to limit the present invention to the specific embodiments, but are for explanation and understanding only.

DETAILED DESCRIPTION

Figure 1:
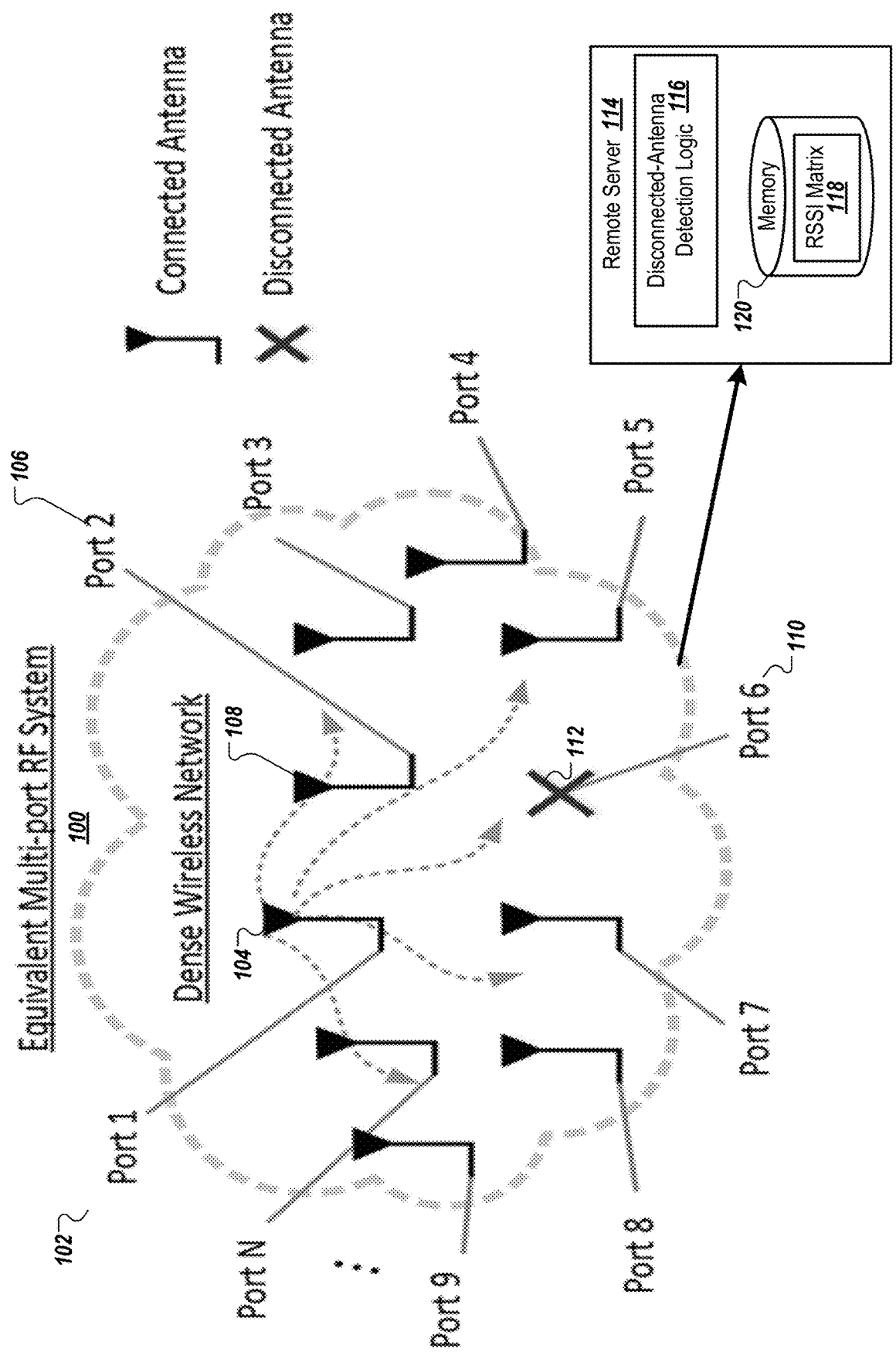
FIG. 1 is a network diagram of an equivalent multi-port radio frequency (RF) system of a dense wireless network and a remote server with a disconnected-antenna detection logic according to one embodiment.

Technologies directed to a cloud-computing system with antenna disconnection detection of distributed antennas in a dense wireless network are described. Many wireless devices used in a fixed wireless infrastructure use external antennas to maintain flexibility in coverage and system gain for each use case. However, antennas may be disconnected from the radio or damage to cabling, antenna, or both may occur. Under these conditions, a network operations center (NOC) may only see changes in radio link-level parameters, including RSSI and throughput parameters. Link degradation due to antenna disconnection may be indistinguishable from environmental factors, including blockage. Traditionally, there is no direct feedback from devices in the fixed wireless infrastructure indicating a condition of an RF signal path. Network scalability and maintainability can be significantly impacted by these types of disconnected antennas. In some cases, when a wireless device with concurrent radios is deployed and yet only a single antenna is connected, a second radio should be shut off to reduce power consumption and potential interference. This may not be done properly at staging (i.e., pre-deployment configuration) by an installer since it is difficult for the installer to know which radio to shut off, even with visual identification of the external RF ports. The manual configuration of selecting a radio to shut down by the installer is error prone.

Aspects of the present disclosure overcome the deficiencies of traditional wireless devices by providing antenna disconnection detection of distributed RF ports in a dense wireless network. Aspects of the present disclosure overcome the deficiencies of traditional wireless devices by providing a cloud-based service that implements a disconnected-antenna detection logic, as described herein. The aspects of the present disclosure can implement antenna-disconnection detection techniques that use RSSI measurements to differentiate between scattered patterns and characteristic patterns that represent a disconnected-antenna conditions. One method receives reports from wireless devices in a wireless network, the reports including RSSI values for each pair of distributed RF ports, and generates an RSSI matrix, including rows (receiving ports) and columns (transmitting ports). The method identifies a characteristic pattern in the RSSI matrix by comparing each RSSI value in the RSSI matrix against a threshold value. The characteristic pattern includes i) two or more elements in a same row having an RSSI value that does not exceed the threshold value and ii) two or elements in a same column having an RSSI value that does not exceed the threshold value. The method stores an indication that a first antenna is disconnected from an RF port corresponding to the same row and the same column. Another method receives data from the wireless devices and generates an RSSI matrix including multiple elements, each storing a receive signal strength indicator (RSSI) value indicative of a signal strength of a wireless link between a transmitter-receiver pair. The method identifies a characteristic pattern in the RSSI matrix. The characteristic pattern includes i) two or more elements in a same row having an RSSI value that does not exceed the threshold value and ii) two or more elements in a same column having an RSSI value that does not exceed the threshold value. The method stores an indication that an antenna is disconnected from an RF port and sends a command to the second wireless device that causes the second wireless device to disable a radio that is coupled to the RF port.

The technology described above with respect to a radio per device can be implemented with devices that have multiple concurrent radios as well. Use of dual concurrent radios, for example, can simplify the detection of disconnected antennas. This is because there is a high correlation between RSSI measured at co-located radios. Range and blockage dependencies at the co-located are similar although antenna directionality may differ. There should be some correlation between the RSSI measurements (RSSI_0 and RSSI_1) when both antennas are connected. RSSI matrix entries (RSSI measurements) become uncorrelated when either one of the co-located radios (radio 0 or 1) is disconnected from the antenna. When one antenna is disconnected, one of the sets of RSSI measurements will show the characteristic cross pattern. When both radios are disconnected from the antenna, both sets of RSSI measurements will show the characteristic cross pattern.

In a dense network of wireless devices, each wireless device can communicate with a number of neighboring devices. The number of wireless neighbors depends on the transmit power, receiver sensitivity, and propagation conditions. Blockage and interference will reduce the average number of wireless neighbors per device. In this sense, the network resembles a multi-port RF system, such as described below with respect to FIG. 1.

FIG. 1 is a network diagram of an equivalent multi-port RF system 100 of a dense wireless network and a remote server with an antenna disconnection detector 116 according to one embodiment. The equivalent multi-port RF system 100 includes multiple RF ports, including RF ports 1-N, where N is a positive integer. A first RF port 102 is coupled to a first antenna 104, a second RF port 106 is coupled to a second antenna 108, and so forth. However, as illustrated in FIG. 1, an antenna is disconnected from a sixth port 110 (labeled as "disconnected antenna condition 112"). A remote server 114 executes a disconnected-antenna detection logic 116. The remote server 114 can include a processing device that implements the antenna disconnection-detection logic 116 as processing logic that comprises hardware (e.g., circuitry, dedicated logic, programmable logic, microcode, etc.), software, firmware, or a combination thereof. The antenna disconnection-detection logic 116 can configure the remote server 114 to operate according to any of the methods, processes, operations, or any combination thereof as described herein. The remote server 114 can receive reports from one or more wireless device in the dense wireless network. The reports can include RSSI values measured at the multiple RF ports and can determine whether an antenna is disconnected from any one or more RF ports of the equivalent multi-port RF system 100. The remote server 114 can also include other components, such as one or more memory devices, additional radios, wired interfaces, or the like. Alternatively, the operations of the remote server 114 can be implemented in a controller device, as described herein.

The remote server 114 can include one or more Central Processing Units (CPUs), microcontrollers, field programmable gate arrays, or other types of processors or processing devices. The remote server 114 can be implemented as part of a cloud-computing system having a collection of devices that implement the disconnected-antenna detection logic 116 as a service. In another embodiment, the remote server 114 is part of a NOC. In another embodiment, the disconnected-antenna detection logic 116 can be implemented in a cluster node within a wireless network. The cluster node can be a centralized controller that is assigned to receive the reports, including the RSSI measurements, as well as detect one or more RF ports that have disconnected-antenna conditions.

The remote server 114 can store a RSSI matrix 118 in one or more memory devices 120. The memory devices 120 can be composed of one or more types of volatile memory, nonvolatile memory, removable storage and/or one or more types of non-removable storage. The memory devices 120 can also include a computer-readable storage medium on which is stored one or more sets of instructions embodying any of the methodologies or functions of the disconnected-antenna detection logic 116 as described herein. Instructions for the program modules 1210 (e.g., disconnected-antenna detection logic 116) may reside, completely or at least partially, within the computer-readable storage medium 1216, system memory 1206 and/or within the processor(s) 1230 during execution thereof by the electronic device 1200, the system memory 1206 and the processor(s) 1230 also constituting computer-readable media. The electronic device 1200 may also include one or more input devices 1218 (keyboard, mouse device, specialized selection keys, etc.) and one or more output devices 1220 (displays, printers, audio output mechanisms, etc.).

As described herein, each radio of a wireless device (also referred to as a node) represents one of the RF ports of the multi-port RF system 100. Each radio can be used to probe and map a RSSI response of every other wireless device within range (also referred to as a neighbor device). The neighbor device can be a wireless device that is part of the same wireless network. Other wireless devices, such as anchor objects (e.g., other access points that are not necessarily part of the same wireless network) can also be used to determine whether there is an antenna disconnected from any of the RF ports of the multi-port RF system 100.

The disconnected-antenna detection logic 116 can detect the disconnected-antenna condition 112 from a matrix of RSSI measurements generated by all pairs of radios (also referred to as an RSSI matrix). A given wireless device may support either one or more radios. Each matrix entry represents the RSSI value received by a single wireless radio from another radio (i.e. P_mn=RSSI value received by radio m as transmitted by radio n), such as illustrated and described below with respect to FIG. 2.

Figure 2:
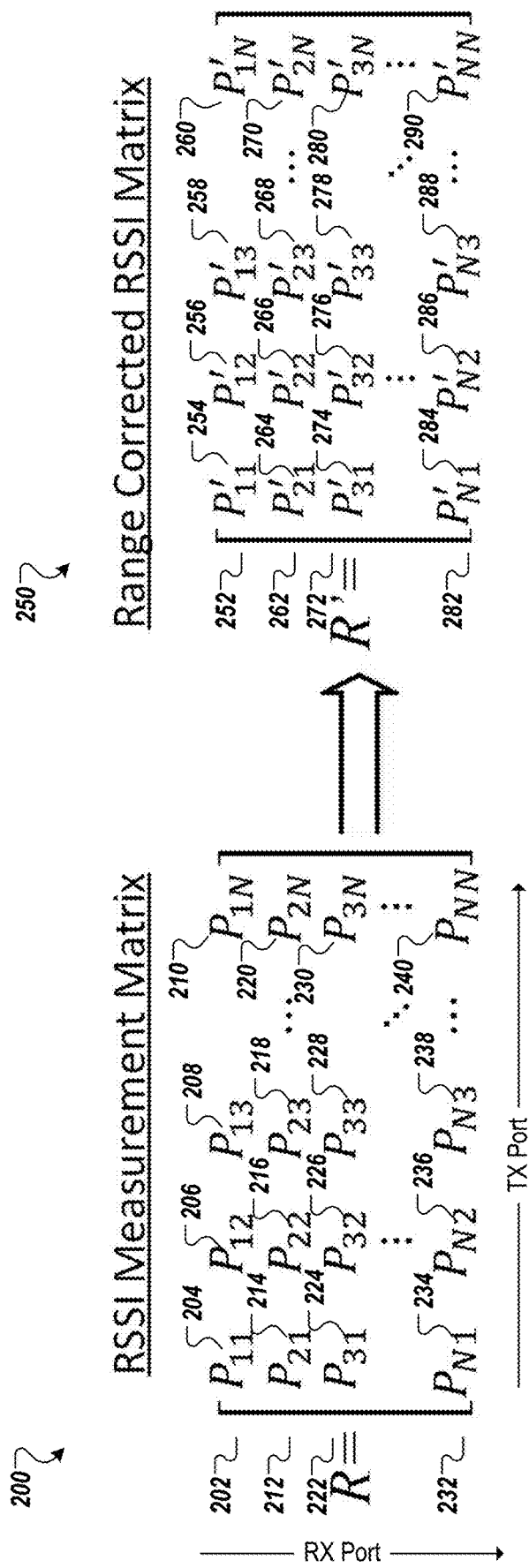
FIG. 2 is a receive signal strength indicator (RSSI) matrix and a range-corrected RSSI matrix according to one embodiment.

FIG. 2 is an RSSI matrix 200 and a range-corrected RSSI matrix 250 according to one embodiment. The RSSI matrix 200, also referred to as a RSSI measurement matrix, can be generated using multiple reports received from multiple wireless devices in a wireless network, as described in more detail below. A wireless device can include one or more radios and each of the one or more radios is coupled to an RF port. A wireless device can measure an RSSI value at each of the RF ports at the wireless device and send the RSSI values to a remote server, such to a device at a cloud-computing system. The remote server can generate the RSSI matrix 200 using the RSSI values received in the reports.

The RSSI matrix 200 includes N rows and N columns (N×N), where each row is associated with a RX port and each column is associated with a TX port, and where N is a positive integer number. A RX port is an RF port at which a RSSI value is measured and a TX port is an RF port from which a signal is transmitted. A RSSI value at any given element is indicative of a signal strength of a respective link between the RX port, corresponding to the given row, and the TX port, corresponding to the given column. For example, the RSSI matrix 200 includes a first row 202 with a first element 204, a second element 206, a third element 208, and an Nth element 210. The RSSI matrix 200 also includes a second row 212 with a first element 214, a second element 216, a third element 218, and an Nth element 220. The RSSI matrix 200 also includes a third row 222 with a first element 224, a second element 226, a third element 228, and an Nth element 230. The RSSI matrix 200 also includes an Nth row 232 with a first element 234, a second element 236, a third element 238, and an Nth element 240. A diagonal of the RSSI matrix 200 includes elements 254, 266, 278, and 290. These elements may be set to have "don't care," "n/a," "empty," or dummy values since there is no RSSI value between RF ports because the RF port and the TX port are the same port in the diagonal. The second element 206 ($P_{12}$) in the first row 202 has a first RSSI value that is measured at a first RF port and is indicative of a signal strength of a link between the first RF port and a second RF port that transmits a signal that is measured at the first RF port. The third element 208 ($P_{13}$) in the first row 202 has a second RSSI value that is measured at the first RF port and is indicative of a signal strength of a link between the first RF port and a third RF port that transmits a signal that is measured at the first RF port. The first row 202 can include additional elements up to the Nth element 210 ($P_{1N}$) that has a Nth RSSI value that is measured at the first RF port and is indicative of a signal strength of a link between the first RF port and an Nth RF port that transmits a signal that is measured at the first RF port. Similarly, the second row 212 includes a first element 214 has an RSSI value that is measured at the second RF port and is indicative of a signal strength of a link between the second RF port and the first RF port that transmits a signal that is measured at the second RF port. The second row 212 includes additional elements 216, 218, and up to Nth element 220. Similarly, the third row 222 includes a first element 224 has an RSSI value that is measured at the third RF port and is indicative of a signal strength of a link between the third RF port and the first RF port that transmits a signal that is measured at the third RF port. The third row 222 includes additional elements 226, 228, and up to Nth element 230. The RSSI matrix 200 can include additional rows up to an Nth row 232 that includes a first element 234, a second element 236, a third element 238, up to an Nth element 240. In short, the RSSI matrix 200 includes multiple elements, each element storing an RSSI value indicative of a signal strength of a respective link between a transmitter-receiver pair in the wireless network and each element being indexed by a radio frequency (RF) port of a transmitter of the transmitter-receiver pair and a RF port of a receiver of the transmitter-receiver pair.

As also illustrated in FIG. 2, the RSSI values of the RSSI matrix 200 can be normalized based on physical distances between RF ports. For example, a physical distance between each pair of RF ports (e.g., physical distance between devices when the RF ports are at separate devices) can be determined and used to remove RSSI range dependency, such as illustrated in a range-corrected RSSI matrix 250. The range-corrected RSSI matrix 250 also includes N rows and N columns (N×N), where each row is associated with a RX port and each column is associated with a TX port. A RSSI value at any given element in the range-corrected RSSI matrix 250 is indicative of a normalized signal strength of a respective link between the RX port, corresponding to the given row, and the TX port, corresponding to the given column. For example, the range-corrected RSSI matrix 250 includes a first row 252 with a first element 254, a second element 256, a third element 258, and an Nth element 260. The range-corrected RSSI matrix 250 also includes a second row 262 with a first element 264, a second element 266, a third element 268, and an Nth element 270. The range-corrected RSSI matrix 250 also includes a third row 272 with a first element 274, a second element 276, a third element 278, and an Nth element 280. The range-corrected RSSI matrix 250 also includes an Nth row 282 with a first element 284, a second element 286, a third element 288, and an Nth element 290. The elements in the RSSI matrix 200 correspond to the same elements in the range-corrected RSSI matrix 250 and the RSSI values in the range-corrected RSSI matrix are each adjusted by a corresponding RSSI offset corresponding to the respective physical distance.

For example, the remote server 114 determines a first physical distance between the first RF port and the second RF port and a second physical distance between the first RF port and the third RF port. The remote server 114 normalizes the second element 206 of the first row 202 by applying a first RSSI offset, corresponding to the first physical distance, to the RSSI value at the second element 206 to obtain a normalized RSSI value that is stored at the second element 256 in the range-corrected RSSI matrix 250. The remote server 114 normalizes the third element 208 of the first row 202 by applying a second RSSI offset, corresponding to the second physical distance, to the RSSI value at the third element 208 to obtain a normalized RSSI value that is stored at the third element 258 in the range-corrected RSSI matrix 250. Similarly, other physical distances are determined for each of the pairs of RF ports and corresponding offset values are applied to the RSSI values in the RSSI matrix 200 to obtain the normalized RSSI values in the range-corrected RSSI matrix 250.

The RSSI values can be normalized to the physical distance between each pair of devices to eliminate RSSI range dependency. In one embodiment, normalization is accomplished by removing a parametrized path loss term, as set forth in equation (1):

$$L_{PL} = 10\alpha \log_{10}(R/R_0) + 20 \log_{10} f + 20 \log_{10}(4\pi R_0/c) \quad (1)$$

where f is frequency of operation, R is the physical distance between transmitter port and receiver port (or expressed as transmitter or transmitter device and receiver or receiver device), $R_0$ is the reference physical distance, $\alpha$ is the path loss exponent ($\alpha=2$ for LOS free space path loss) and c is the speed of light in earth atmosphere. In one embodiment, the physical distance between RF ports (i.e., radios) can be determined during installation or during deployment, using global positioning system (GPS) coordinates. For example, a first GPS coordinate can be assigned to the first RF port and a second GPS coordinate can be assigned to the second RF port. The remote server 114 can determine a first physical distance between the first and the second GPS coordinates and use the physical distance for normalizing the RSSI values. Alternatively, other path loss models can be used with varying degrees of accuracy.

In another embodiment, the physical distance between RF ports (i.e., radios) can be determined after installation or during deployment using time of flight (TOF) measurements. A TOF measurement is an amount of time it takes data to travel from the one port to another. For example, a TX port can send data to an RX port. The TOF measurement would reflect an amount of time it takes data to be transmitted by the TX port and received by the RX port.

It should be noted that antenna directionality, blockage, and other propagation characteristics can still impact the RSSI measurements in the RSSI matrix. That is, some corrected RSSI values for a normally connected antenna can still fall below a specified level due to blockage, directionality, or other propagation characteristics. As described herein, the disconnected-antenna detection logic 116 can differentiate between an antenna-disconnection condition and antenna directionality, blockage, and other propagation characteristics using the RSSI matrix 200 or the range-corrected RSSI matrix 250 by distinguishing between scattered patterns and characteristic patterns in the RSSI matrix, such as described and illustrated below with respect to FIGS. 3A-3B. To differentiate between a scattered pattern and a characteristic pattern, the remote server 114 can compare each of the RSSI values (or normalized RSSI values) against a threshold value (also referred to as a detection threshold). For example, when some corrected RSSI values for a normally connected antenna fall below the threshold value (i.e., RSSI value does not exceed the threshold value), the RSSI matrix (or range-corrected RSSI matrix) appears as random matrix entries with no correlation between elements having RSSI values below the threshold value, such as illustrated in FIG. 3A.

Figures 3A, 3B:
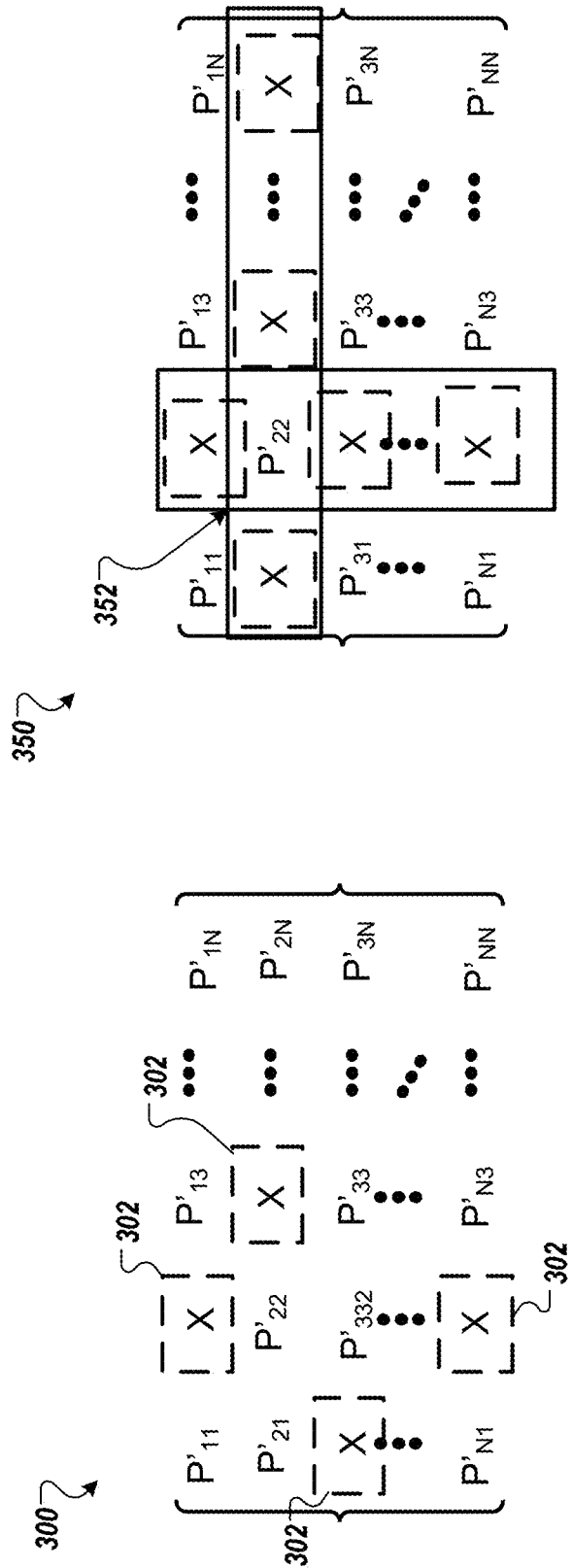
FIG. 3A is an RSSI matrix with scattered entries below a threshold value due to block and directionality according to one embodiment.
FIG. 3B is an RSSI matrix with a characteristic pattern of entries below a threshold value due to a disconnected-antenna condition according to one embodiment.

FIG. 3A is an RSSI matrix 300 with scattered entries 302 below a threshold value due to block and directionality according to one embodiment. The scattered entries 302 are elements with an "X" label to indicate that the RSSI values at these elements are below the threshold value.

However, a disconnected antenna would produce a distinct pattern, referred to as a characteristic pattern or signal in the RSSI matrix (or range-corrected RSSI matrix). For example, a radio with a disconnected-antenna condition will neither receive nor transmit efficiently to neighboring radios. Therefore, the entire row and column associated with this radio will differ significantly from neighboring radios, such as illustrated in FIG. 3B.

FIG. 3B is an RSSI matrix 350 with a characteristic pattern 352 of entries below a threshold value due to a disconnected-antenna condition according to one embodiment. The entries of characteristic pattern 352 are elements with an "X" label to indicate that the RSSI values at these elements are below the threshold value. In FIG. 3B, the characteristic pattern 352 is a characteristic cross pattern.

The RSSI matrices for a real wireless network could include a combination of signals including antenna disconnection(s). The remote server 114 (or the disconnected-antenna detection logic 116) can implement one or more algorithms to correlate matrix entries with characteristic patterns to determine a disconnected-antenna condition to within a statistical threshold value. This is further described with respect to an example of a simplified wireless network defined by the parameters listed in Table 1 and described below with respect to FIGS. 4-6B.

TABLE 1

Simplified Wireless Network Model

| Parameter | Unit | Value | Description |
|---|---|---|---|
| Frequency | GHz | 5.8 | Frequency of wireless operation |
| Service Area | Km$^2$ | 0.01 | The physical area over which the radios are randomly distributed |
| $N_R$ | — | 20 | Number of radios in the network |
| $N_D$ | — | 5 | Number of disconnected antennas |
| $G_{ANT}$ | dBi | 10 | Peak gain of cosine antenna pattern |
| FBR | dB | 15 | Antenna front to back ratio |
| $G_{DIS}$ | dBi | −30 | Average gain of disconnected antenna port |
| $P_{TX}$ | dBm | 21 | Total transmit power at the antenna port |
| $L_{RND}$ | dB | 15 | Standard deviation of random path loss fluctuations at each radio (i.e. shadowing, blockage, multipath, etc.) |
| $S_{RX}$ | dBm | −95 | Minimum receiver sensitivity to decode probe/response packet. This represents RSSI noise floor. |
| $D_T$ | — | 50% | Correlation threshold for antenna disconnection detection |

Figure 4:
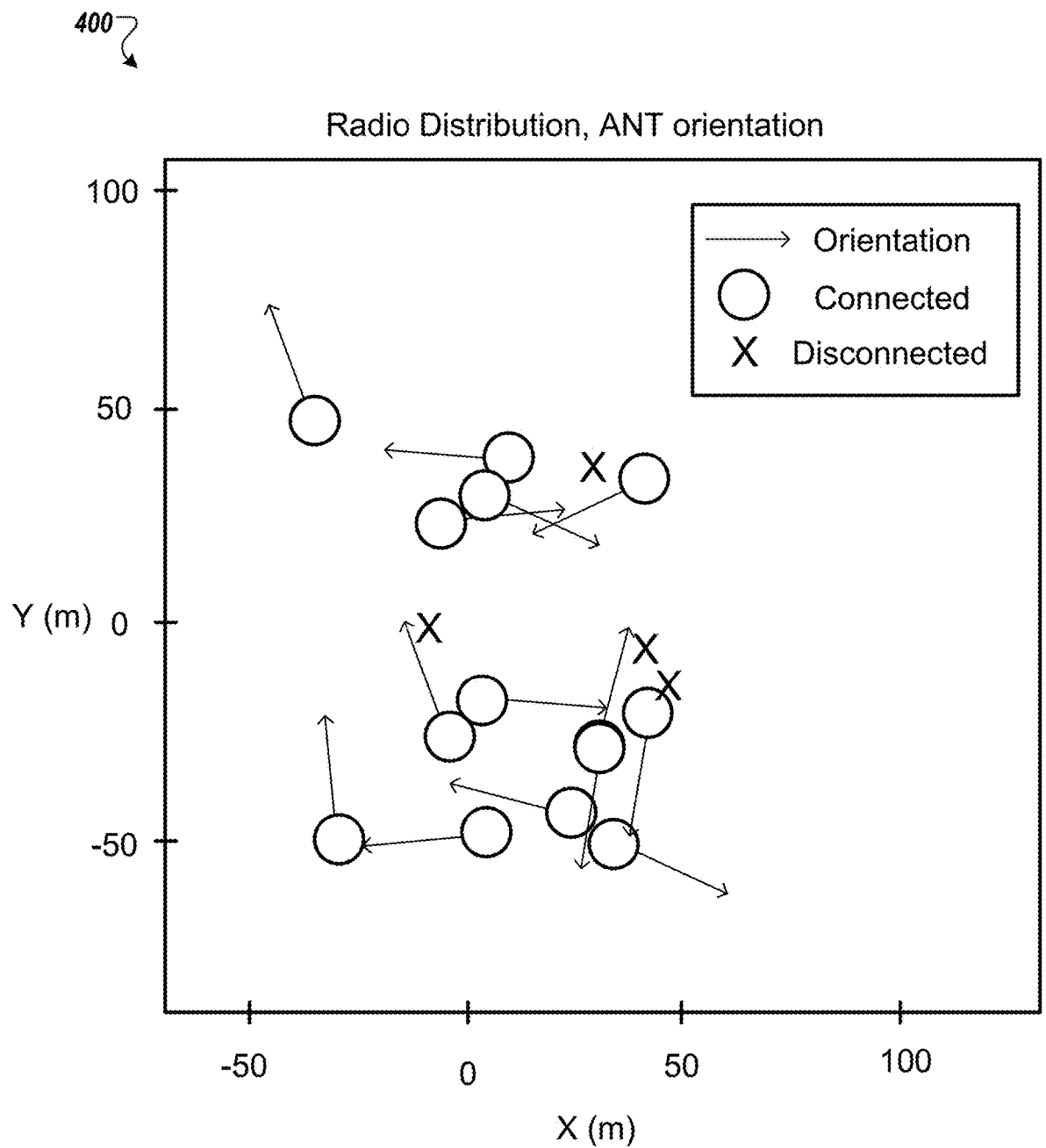
FIG. 4 is a graph of radio distribution and antenna orientation in a wireless network according to one embodiment.

FIG. 4 is a graph 400 of radio distribution and antenna orientation in a wireless network according to one embodiment. In particular, the radio distribution and antenna orientations for the 20 radios and 5 disconnected antennas (radios 1, 2, 6, 8 and 9) are shown.

Figure 5:
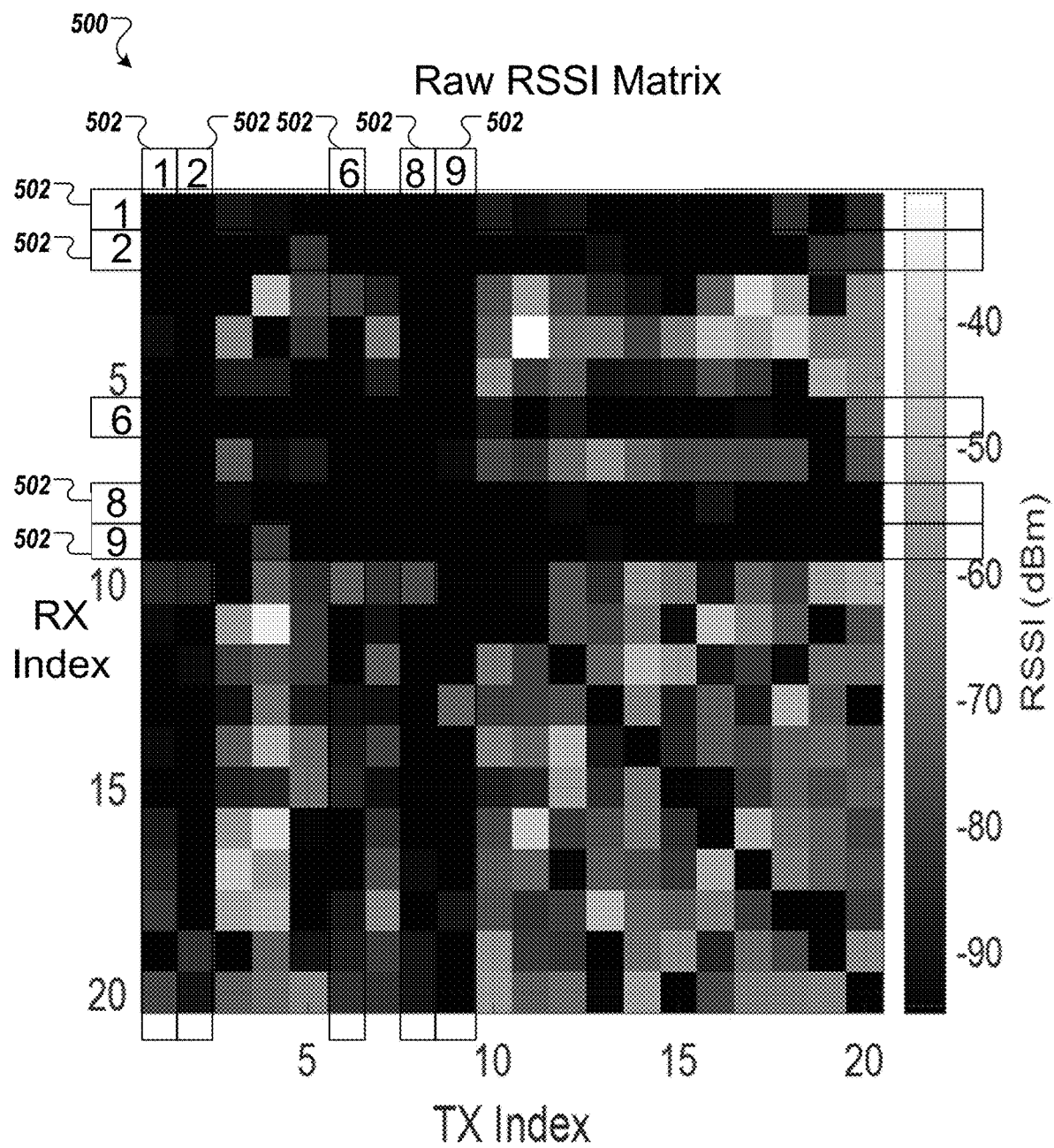
FIG. 5 is a RSSI matrix with raw data between all transmit (TX) and receive (RX) radio pairs according to one embodiment.

FIG. 5 is a RSSI matrix 500 with raw data between all TX and RX radio pairs according to one embodiment. The raw RSSI matrix 500 shows regions with significant RSSI variation and solid regions at the noise floor. It is difficult to determine from the data (or the plot) of the RSSI matrix 500 which antennas are disconnected. The RSSI matrix 500 has the raw RSSI measurements for each pair of a RX port and a TX port, each row corresponding to a specific RX index (or RF identifier) and each column corresponding to a specified TX index (or RF identifier). The RSSI measurements are progressively darker for the lower RSSI values. The RSSI matrix 500 includes various characteristic cross patterns 502, corresponding the radio indexes, 1, 2, 6, 8, and 9, as the RSSI values in the intersection row and columns have RSSI values that are less than the threshold value, as described herein. As described below with respect to FIGS. 6A-6B, the characteristic cross patterns can be identified using a cross correlation of the characteristic cross patterns in FIG. 6A, resulting in correlation coefficients of the radio indexes 1, 2, 6, 8, and 9, exceed a detection threshold value, the detection threshold value representing a strong correlation with respect to the characteristic cross pattern in FIG. 6A.

Figure 6A:
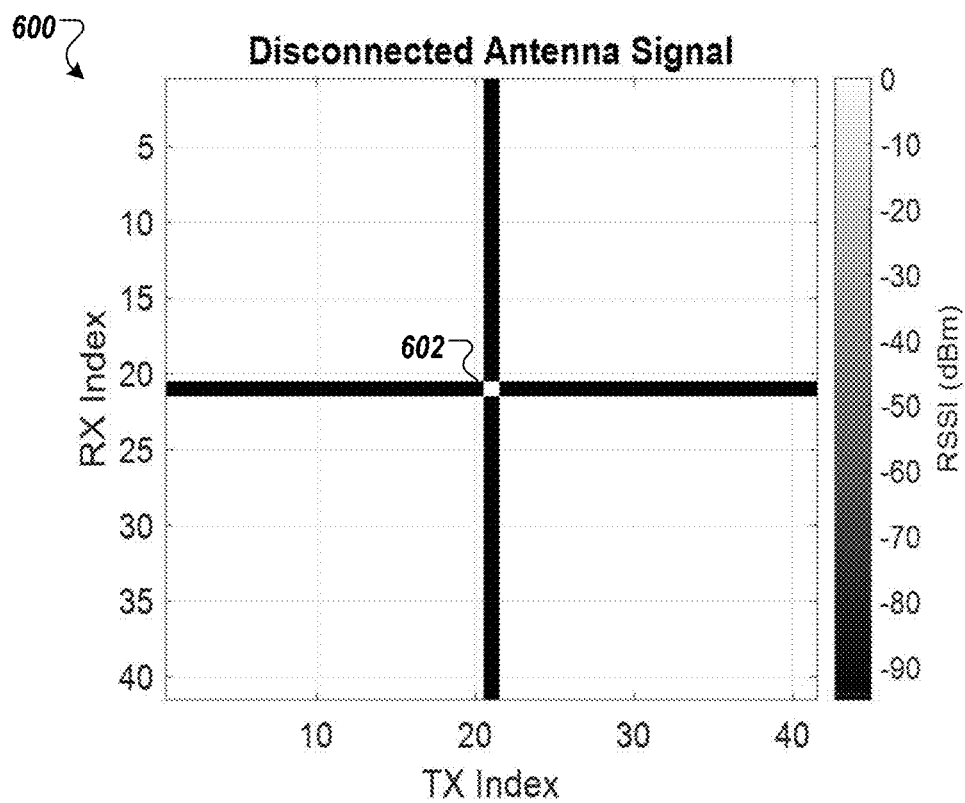
FIG. 6A is a graph of a disconnected antenna signal as a characteristic cross according to one embodiment.

FIG. 6A is a graph 600 of a disconnected antenna signal as a characteristic cross pattern 602 according to one embodiment. For a given RX index and TX index, collectively referred to as a radio index (e.g., $P_{12}$), the characteristic cross pattern 602 can be that all elements in the corresponding row and all elements in the corresponding column have an RSSI value that is less than a threshold value. The threshold value could be set at −80 dBm for purposes of determining a characteristic pattern, including the characteristic cross pattern 602. Alternatively, other values can be used for the threshold value.

Figure 6B:
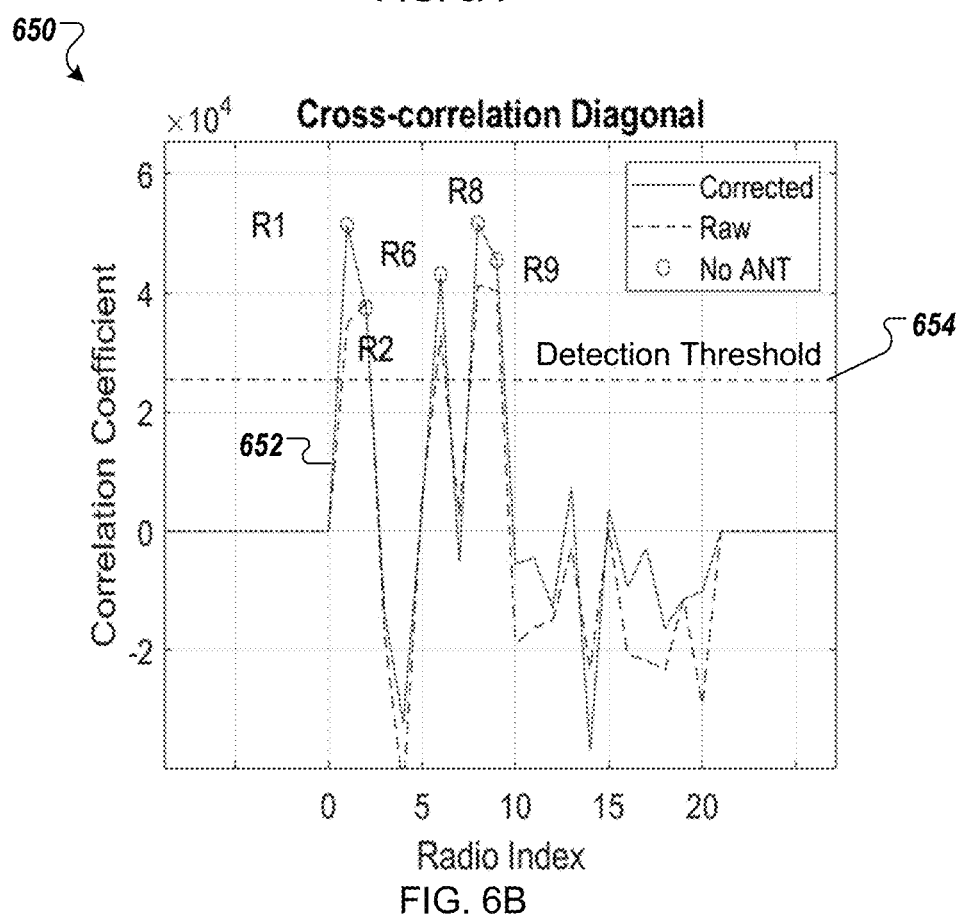
FIG. 6B is a graph of a cross-correlation matrix diagonal used to accurately detect disconnect antennas according to one embodiment.

The remote server 114 (or the disconnected-antenna detection logic 116) can include a detection algorithm that is a two-dimensional cross-correlation between the disconnected antenna signal (i.e., characteristic cross pattern 602) and RSSI values in the RSSI matrix (e.g., 200 or 250). It should be noted that the detection algorithm can be further simplified by noting that a single time-division duplex (TDD) radio uses the same co-located antenna(s) for transmit and receive. Antenna disconnection signals are then centered along the RSSI matrix diagonal where transmit and receive indices are the same (i.e. same radio). Therefore, the correlation matrix diagonal is used to accurately detect disconnect antennas as shown in FIG. 6B. It should be noted that corrected and raw RSSI matrices produce very similar correlations. In some cases, a priori knowledge of radio physical location is not required.

FIG. 6B is a graph 650 of a cross-correlation matrix diagonal used to accurately detect disconnected antennas according to one embodiment. The cross-correlation matrix diagonal can be used to determine a correlation coefficient 652 for each of the radio indexes. The correlation coefficient can indicate a disconnected antenna when the correlation coefficient is above a detection threshold value 654. In graph 650, the correlation coefficients for radio indexes 1, 2, 6, 8, and 9 are above the detection threshold value 654. Thus, the radio indexes are reported as having no antennas or disconnected antennas.

Figure 7:
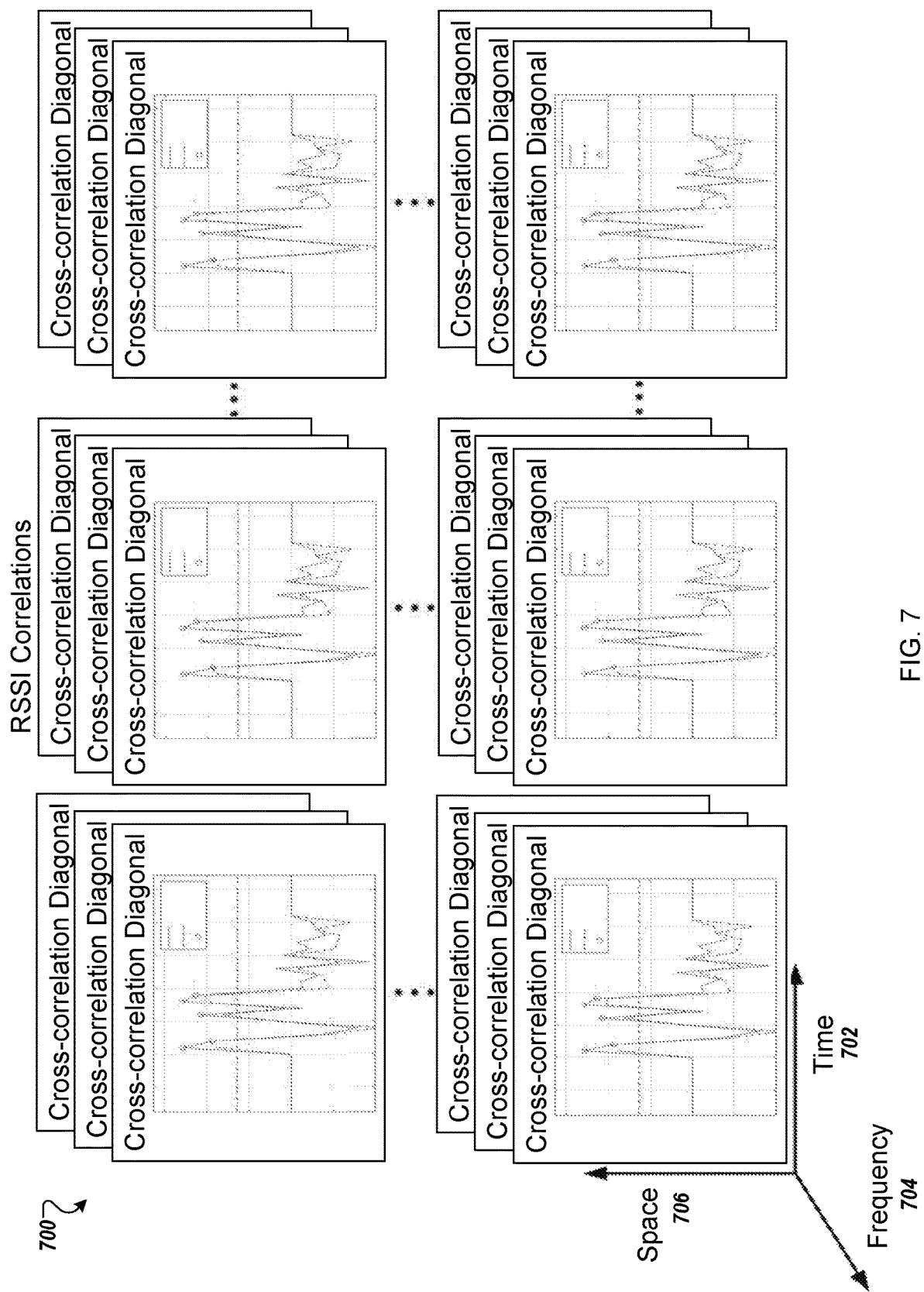
FIG. 7 is a set of graphs of RSSI correlations performed over time, frequency, and space according to one embodiment.

In some embodiments, false detection results can be minimized by performing multiple RSSI correlations over time, frequency and space as shown in FIG. 7.

FIG. 7 is a set of graphs 700 of RSSI correlations performed over time 702, frequency 704, and space 706 according to one embodiment. Across any given network, the RSSI matrix can be updated in pieces over time when local network traffic is at a minimum. A time weighted moving average of the RSSI matrix can be used to suppress random variation. This may also help to differentiate between fully disconnected antennas from transient effects. For example, a broken RF cable seal may allow water seepage into the signal path, temporarily disconnecting the antenna. When the water is no longer present, the antenna may be considered connected.

Figure 8:
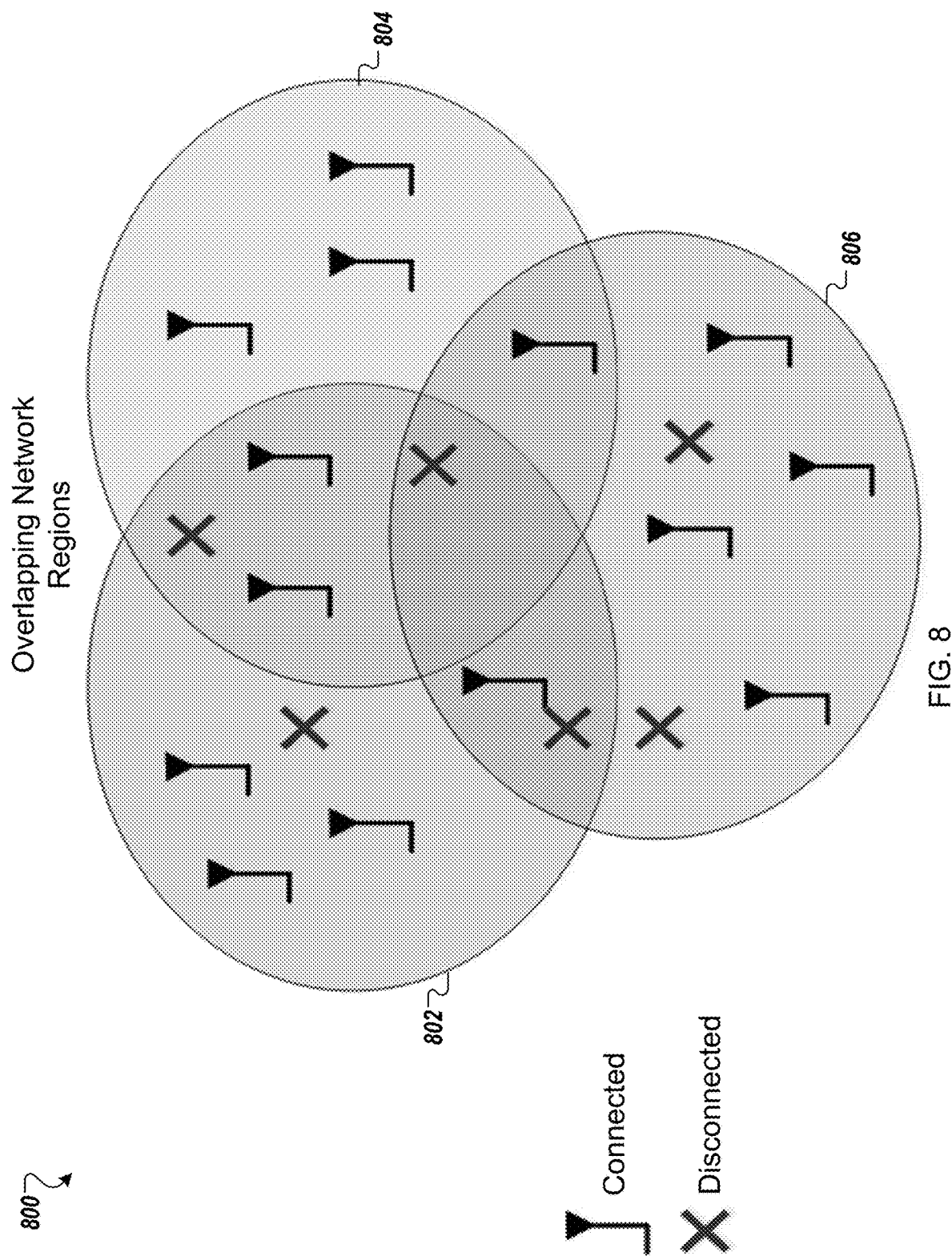
FIG. 8 is a network diagram illustrating overlapping network regions according to one embodiment.

Radios capable of multi-channel operation may also compare correlations across channels. Antenna disconnection is not significantly frequency dependent within the band of operation. Unrelated frequency dependent phenomena may then be filtered out. Finally, a large dense network may be subdivided into multiple overlapping RSSI matrices to minimize resource requirements of the correlation computations, such as illustrated in FIG. 8. The antenna-disconnection detection results may be compared across all RSSI matrices for validation.

FIG. 8 is a network diagram 800 illustrating overlapping network regions according to one embodiment. The overlapping regions can include a first region 802, a second region 804, and a third region 804. A portion of each of the first region 802, second region 804, and third region 806 overlap. Each of the regions can include one or more connected antennas and one or more disconnected antennas.

As described herein, concurrent radios can be used to detect an antenna-disconnection condition by determining a correlation, if any, between the RSSI values of the concurrent radios, as illustrated and described below with respect to FIGS. 9A-9B. Wireless devices can include wireless local area network (WLAN) radios that operate in the 2.4 GHz and 5 GHz bands and utilize various WLAN protocols, such as the Wi-Fi® protocols (e.g., 802.11n, 802.11ac, or the like). For example, many Wi-Fi® chipsets support dual concurrency on either 2.4 GHz ISM or 5 GHz U-NII bands. Typically, RF circuitry for each radio is designed to maximize isolation to avoid desensing the receivers especially for asynchronous operation (e.g., carrier-sense multiple access with collision avoidance (CSMA-CA). The presence of two radios on a single wireless device can enable easier detection of a disconnected-antenna condition based on RSSI measurements of the two co-located radios. Alternatively, other types of radios can be used to determine disconnected-antenna conditions using the technologies described herein.

In particular, use of dual concurrent radios (dual RF ports at the same device) simplifies the detection of disconnected antennas. This is because there is a high correlation between RSSI measured at co-located radios. Range and blockage dependencies at the two radios are similar although antenna directionality may differ. There should be some correlation between radio 0 and 1 RSSI measurements when both antennas are connected, such as illustrated in FIG. 9A. The entries in the RSSI matrix become uncorrelated when either radio 0 or 1 is disconnected from an antenna, such as illustrated in FIG. 9B. When both radios are disconnected from the antenna, both sets of RSSI measurements will show the characteristic cross pattern.

Figure 9A:
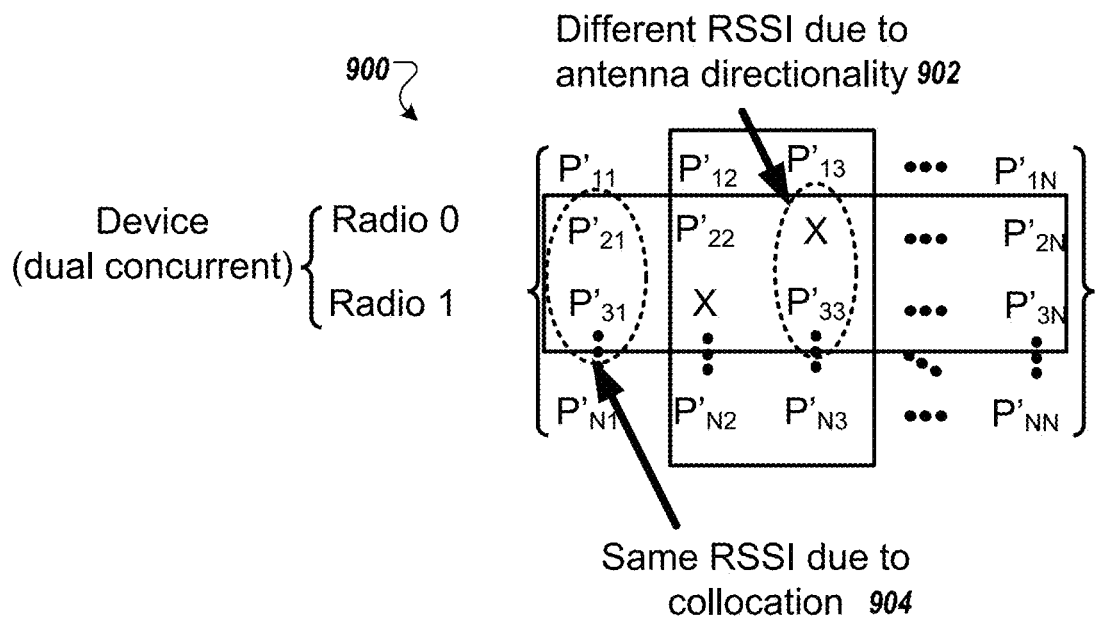
FIG. 9A is a RSSI matrix with different RSSI values due to antenna directionality and similar RSSI values due to collocation according to one embodiment.

FIG. 9A is a RSSI matrix 900 with different RSSI values 902 due to antenna directionality and similar RSSI values 904 due to collocation according to one embodiment.

Figure 9B:
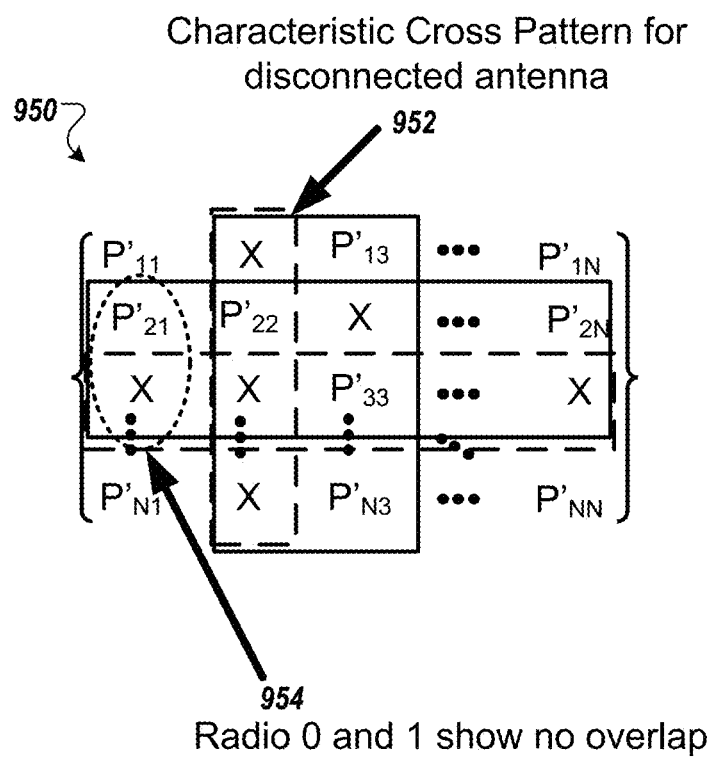
FIG. 9B is a RSSI matrix with a characteristic cross pattern for a disconnected antenna according to one embodiment.

FIG. 9B is a RSSI matrix 950 with a characteristic cross pattern 902 for a disconnected antenna according to one embodiment. RSSI matrix 950 also indicates that there is no overlap 954 between radio 0 and radio 1 in the first column. The characteristic cross pattern 902 indicates that each element in the column has an RSSI value that is less than a threshold value (labeled "X") and each element in the row has an RSSI value that is less than the threshold value (labeled "X").

As described herein, the remote server can be a cloud-computing system. The cloud-computing system can coordinate an antenna detection process between multiple nodes to accurately detect and shutoff unused radios to reduce interference, such as illustrated in an example network diagram of FIG. 10.

Figure 10:
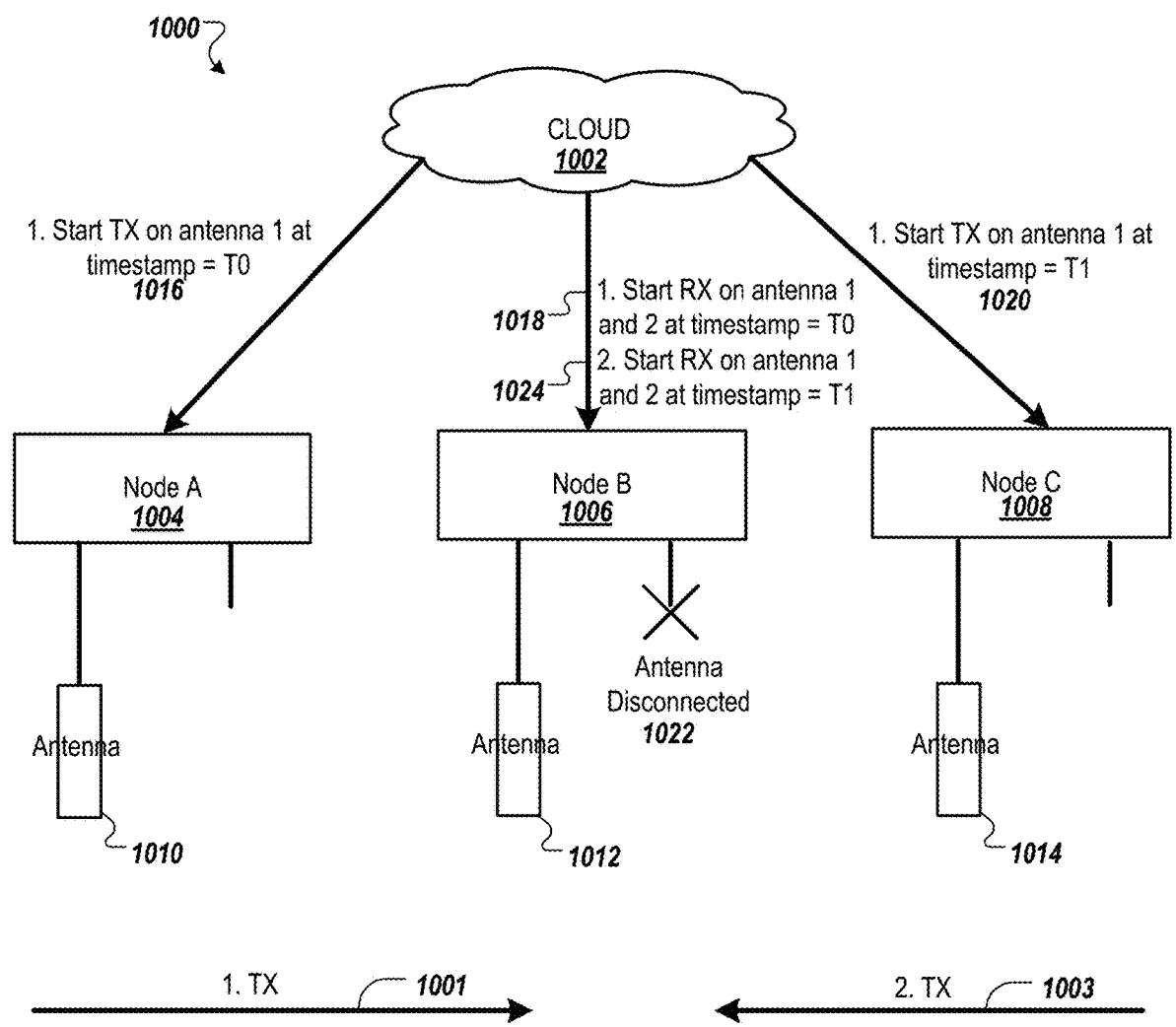
FIG. 10 is a network diagram with a cloud-computing system that implements an antenna detection process to accurately detect and shutoff unused radios to reduce interference according to one embodiment.

FIG. 10 is a network diagram 1000 with a cloud-computing system 1002 that implements an antenna detection process to accurately detect and shutoff unused radios to reduce interference according to one embodiment. In the network diagram 1000, a first node 1004, a second node 1006, and a third node 1008 are in communication with the cloud-computing system 1002. The first node 1004 has a first antenna 1010 that is connected. The second node 1006 has a first antenna 1012 connected and expects to have a second antenna connected. The third node 1008 has a first antenna 1014 connected. The cloud-computing system 1002 starts the antenna detection process by sending a TX command 1016 to the first node 1004. The TX command 1016 instructs the first node 1004 to transmit data in a first transmission 1001 on the first antenna 1010 at a first time (To). The cloud-computing system 1002 sends a RX command 1018 to the second node 1006. The RX command 1018 instructs the second node 1006 to monitor for the first transmission 1001 on both the first antenna 1012 and an expected second antenna 1022 at the first time (To). The second node 1006 compares a first RSSI value of the first transmission 1001 from the first antenna 1012 and a second RSSI value of the transmission 1001 from the expected second antenna 1022. The second RSSI value can indicate that the expected second antenna 1022 is disconnected. Alternatively, the difference between the first RSSI value and the second RSSI value can indicate that the expected second antenna 1022 is disconnected.

The cloud-computing system 1002 sends a TX command 1020 to the third node 1008. The TX command 1020 instructs the third node 1008 to transmit data in a second transmission 1003 on the first antenna 1014 at a second time (Ti). The cloud-computing system 1002 sends a RX command 1022 to the second node 1006. The RX command 1022 instructs the second node 1006 to monitor for the second transmission 1003 on both the first antenna 1012 and an expected second antenna at the second time (Ti). The second node 1006 compares a third RSSI value of the second transmission 1003 from the first antenna 1012 and a fourth RSSI value of the second transmission 1003 from the expected second antenna 1022. The fourth RSSI value can indicate that the expected second antenna 1022 is disconnected. Alternatively, the difference between the third RSSI value and the fourth RSSI value can indicate that the expected second antenna 1022 is disconnected. In another embodiment, the first, second, third, and fourth RSSI values can indicate that the expected second antenna 1022 is disconnected.

In one embodiment, the TX commands can include a first format as expressed in Table 2:

TABLE 2

| TX Command Format | | | | | |
|---|---|---|---|---|---|
| TX Antenna | TX Power | Channel | Pattern | Start Timestamp | End Timestamp |

In one embodiment, the RX commands can include a second format as expressed in Table 3:

TABLE 3

| RX Command Format | | | | | | |
|---|---|---|---|---|---|---|
| TX Node MAC | TX Power | RX Antenna | Channel | Pattern | Start Timestamp | End Timestamp |

In one embodiment, each node can use a "Probe Response" frame to exchange information. Alternatively, other types of frames, such as action frames, can be used to exchange information. An example of two nodes exchanging information using probe responses are described and illustrated with respect to FIG. 11.

Figure 11:
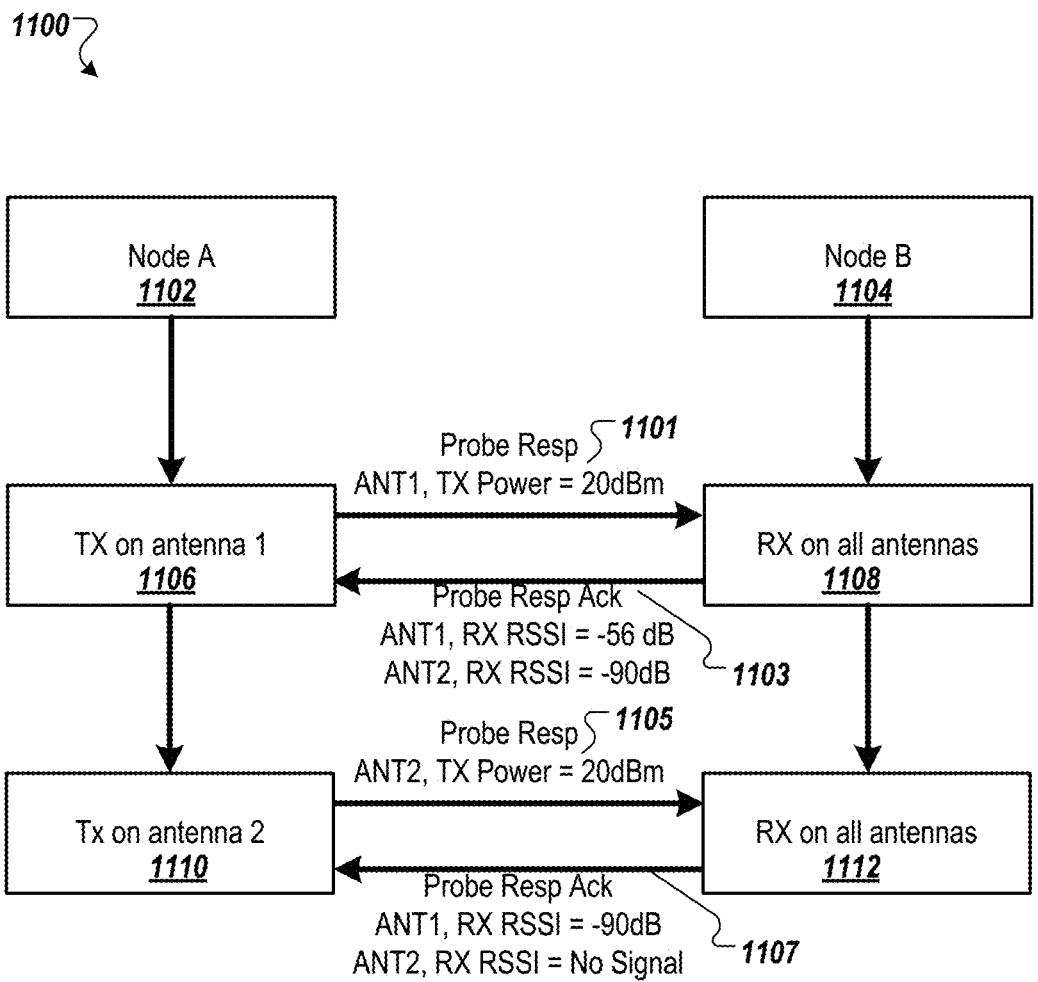
FIG. 11 is a flow diagram of an antenna detection process between a pair of radios according to one embodiment.

FIG. 11 is a flow diagram of an antenna detection process 1100 between a pair of radios according to one embodiment. The antenna detection process 1100 can be implemented using first processing logic of a first node 1102 and second processing logic of a second node 1104. The first processing logic and the second processing logic can comprise hardware, software, firmware, or any combination thereof.

The antenna detection process 1100 begins by the first node 1102 sending a first probe response 1101 with a first antenna (block 1106). The first probe response 1101 indicates a TX antenna configuration (antenna 1) and a TX power (20 dBm). This information can be embedded in information element fields of the first probe response 1101. The second node 1104 receives the first probe response 1101 on all of its antennas (block 1108) and responds with a probe response acknowledgement (ACK) from each of the antennas at block 1108. For example, if the second node 1104 includes two antennas, the second node 1104 sends a first probe response ACK 1103 from a first antenna and a second probe response ACK 1105 from a second antenna. The first probe response ACK can indicate the first antenna and a first RSSI value that represents a signal strength between the first antenna 1106 of the first node 1102 and the first antenna on the second node 1104. The second probe response ACK can indicate the second antenna and a second RSSI value that represents a signal strength between the first antenna 1006 of the first node 1102 and the second antenna on the second node 1004. Alternatively, the second node 1104 can send a probe response 1103 with the first antenna identifier (ANT1), the first RSSI value (e.g., −56 dB), the second antenna identifier (ANT2), and the second RSSI value (e.g., −90 dB), such as embedded in the information element field.

The antenna detection process 1100 continues for all antennas at the first node 1102, including sending a third probe response 1105 with a second antenna (block 1110). The third probe response 1105 indicates a TX antenna configuration (antenna 2) and a TX power (20 dBm). This information can be embedded in information element fields of the third probe response 1105. The second node 1104 receives the third probe response 1105 on all of its antennas (block 1112) and responds with a probe response acknowledgement (ACK) from each of the antennas 1108 or a probe response 1107 with the first antenna identifier (ANT1), the first RSSI value (e.g., −90 dB), the second antenna identifier (ANT2), and the second RSSI value (e.g., no signal), such as embedded in the information element field.

The antenna detection process 1100 can continue with each node and antenna combination. In the case where a node still has both radios active but only a single antenna attached and the TX happens on the no-antenna radio, the RX nodes receiving the signal may or may not receive the TX signal. In the case where no signal is received from both of the RX node's antennas and the transmission time window elapses, the RX node would propagate a no-signal-received message to the cloud-computing system so the cloud-computing system knows the TX node may be transmitting on a radio with no antenna attached. Both the first node 1102 and the second node 1104 can propagate results from the probe response exchange to the cloud-computing system. The cloud-computing system can use an RSSI delta between the two antennas to determine the radio with the disconnected antenna and shuts off the respective radio. As more radios are shut off, the node and antenna combination reduces and improves the detection time.

Figure 12:
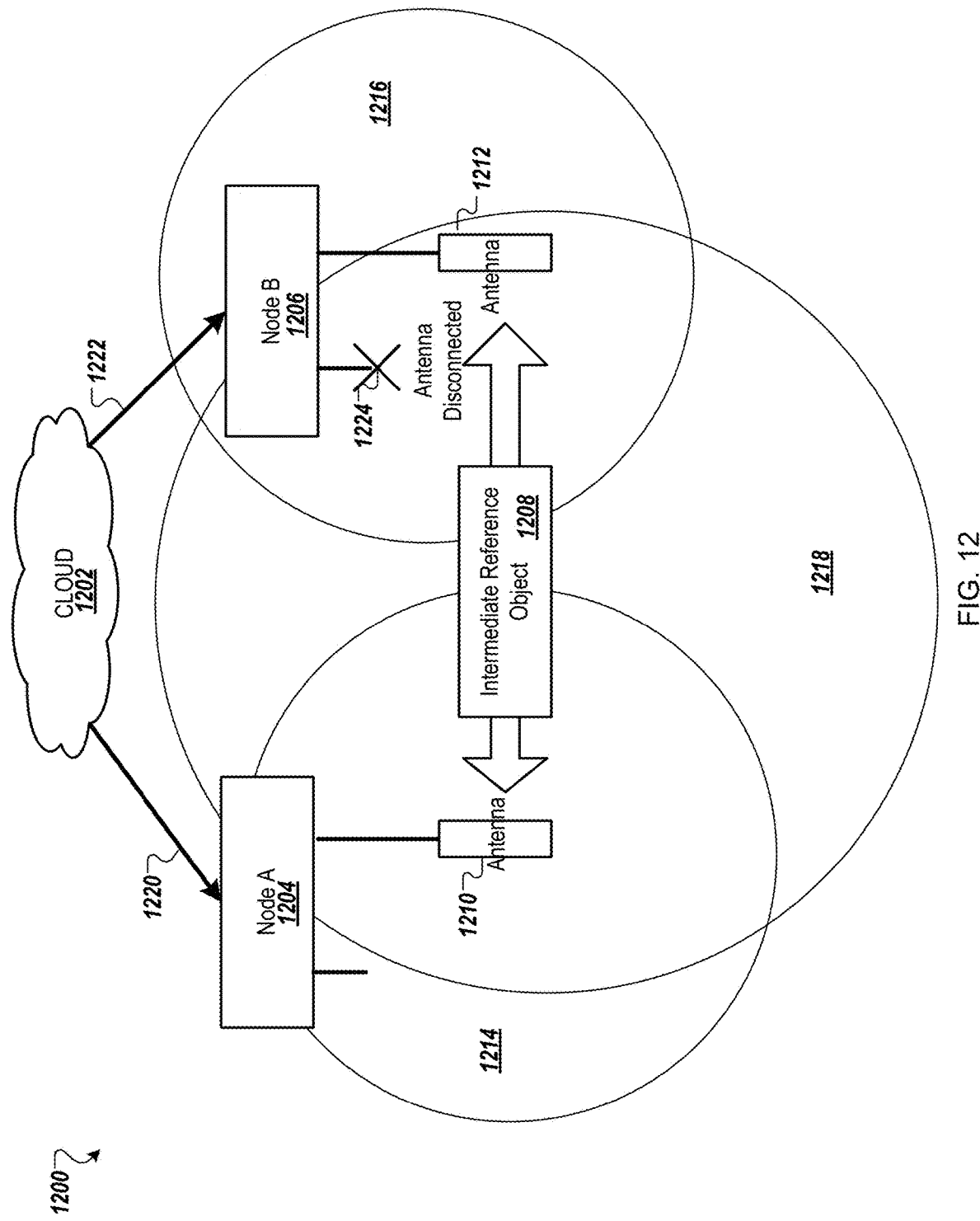
FIG. 12 is a network diagram with a cloud-computing system that implements an antenna detection process with two nodes and an intermediate reference object according to one embodiment.

In the case where two nodes are not directly reachable, the cloud can utilize intermediate reference objects as anchor objects. An intermediate reference object can be an out-of-network access point, an out-of-network device, or the like. An example of two wireless device FIG. 12 is a network diagram with a cloud-computing system 1202 that implements an antenna detection process with two nodes and an intermediate reference object according to one embodiment. In the network diagram 1200, a first node 1204, a second node 1206, and an intermediate reference object 1208 (also referred to as an anchor object). The first node 1204 and the second node 1206 are in in communication with the cloud-computing system 1202 and the intermediate reference object 1208 can be an out-of-network device. That is, the first node 1204 and the second node 1206 can be part of a wireless network. The intermediate reference object 1208 can be a wireless device, but is not part of the wireless network and does not communicate with the cloud-computing system 1202. The first node 1204 has a first antenna 1210 that is connected. The second node 1206 has a first antenna 1212 that is connected and expects to have a second antenna connected, although the second antenna is disconnected (labeled as antenna disconnected 1224). In this embodiment, the two nodes are part of the same wireless network, but are not directly reachable. This is, the second node 1206 is outside a signal range 1214 of the first node 1204 and the first node 1204 is outside a signal range 1216 of the second node 1206. The first node 1204 and the second node 1206 are inside a signal range 1218 of the intermediate reference object 1208. The cloud-computing system 1202 starts the antenna detection process by sending a RX command 1220 to the first node 1204. The RX command 1220 instructs the first node 1204 to monitor for a beacon frame (or other action frame) from the intermediate reference object 1208 via all antennas (i.e., on the first antenna 1210) at a first time (To). The cloud-computing system 1202 sends a RX command 1222 to the second node 1206. The RX command 1222 instructs the second node 1206 to monitor for the beacon frame from the intermediate reference object 1208 via all antennas at the first time (To). The first node 1204 measures a first RSSI value based on receiving the beacon frame via the first antenna 1210. The second node 1206 measures a second RSSI value based on receiving the beacon frame via the first antenna 1212. The second node 1206 also measure a third RSSI value, if any, based on any signal received via the antenna disconnected 1224. The third RSSI value can indicate that the expected second antenna is disconnected. Alternatively, the difference between the second RSSI value and the third RSSI value can indicate that the expected second antenna is disconnected. The first node 1204 and the second node 1206 can each report the results of the exchange with the intermediate reference object 1208 to the cloud-computing system 1202. The cloud-computing system 1202 can determine the antenna disconnected 1224 based on the results reported from the first node 1204 and the second node 1206. Alternatively, the cloud-computing system 1202 can determine the antenna disconnected 1224 responsive to the results from the second node 1206.

In one embodiment, the second node 1206 can send a report in a first format as follows TX commands can include a first format as expressed in Table 4:

TABLE 4

Report Format

| TX Node MAC | TX Power | RX Antenna | Channel | Pattern | Start Time-stamp | End Time-stamp |
| --- | --- | --- | --- | --- | --- | --- |
| MAC of other Access Point | NA | Antenna 1 | 36 | 2 ms every 100 ms | T0 | T0 + 300 ms |
| MAC of other Access Point | NA | Antenna 2 | 36 | 2 ms every 100 ms | T0 | T0 + 300 ms |

The first node 1204 can send a similar report in this first format. However, because the first node 1204 only includes the first antenna 1210, the report can include a single row.

Figure 13:
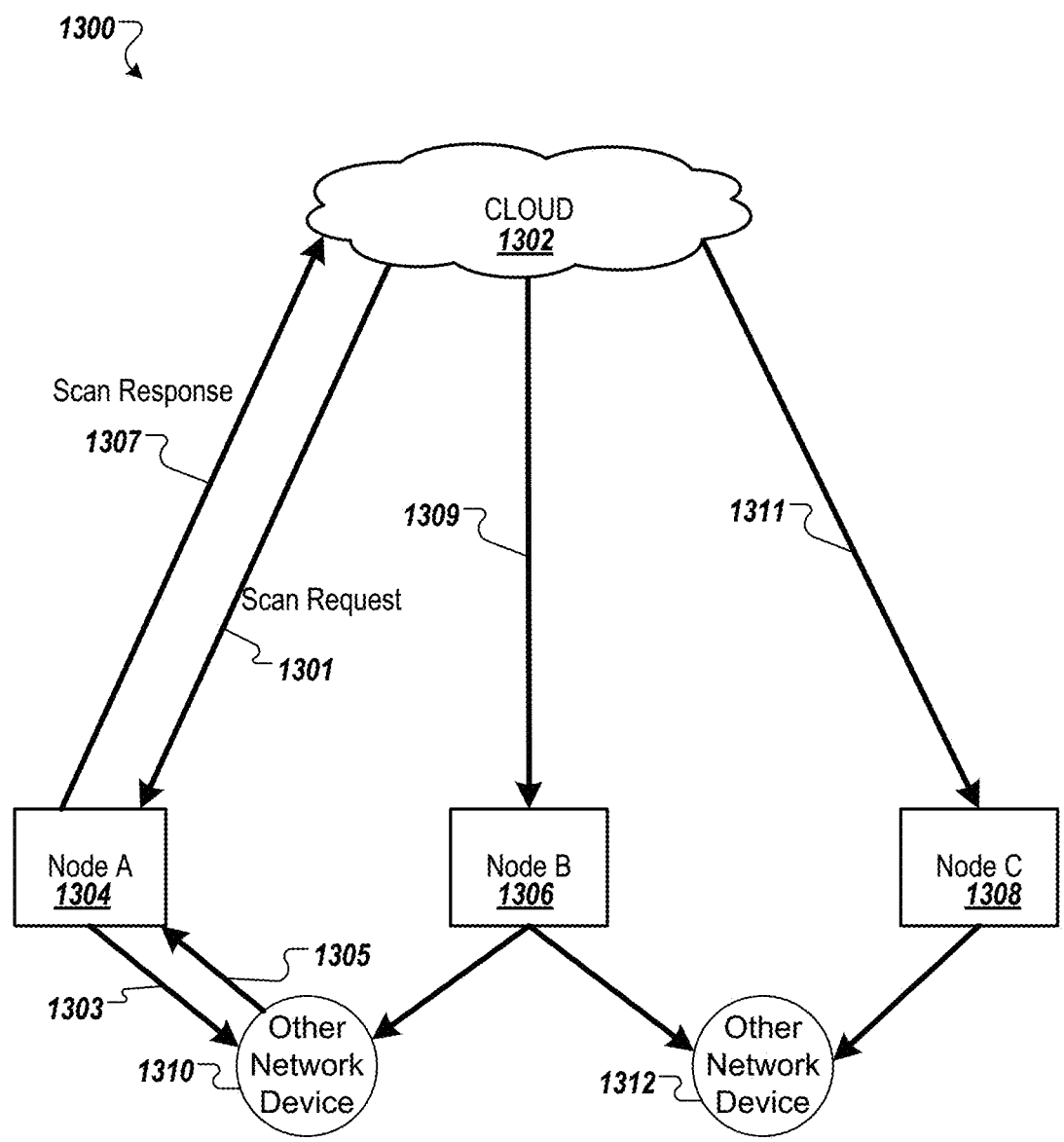
FIG. 13 is a network diagram of a cloud-computing system, three nodes, and two other network devices according to one embodiment.

As described above, the cloud-computing system 1202 can use the reported RSSI values from all antennas to determine if one of the antennas is disconnected. On an active channel, an RSSI value for the intermediate reference object 1208 can also be obtained faster by instructing the first node 1204 (or the second node 1206) to transmit a directed probe requests to the intermediate reference object 1208, such as illustrated in FIG. 13. The cloud-computing system 1202 could also instruct multiple nodes to transmit broadcast probes to obtain all possible intermediate reference objects and use the results from multiple nodes to identify all possible intermediate reference objects.

FIG. 13 is a network diagram 1300 of a cloud-computing system 1302, three nodes 1304-1308, and two other network devices 1310, 1312 according to one embodiment. The cloud-computing system 1302 sends a scan request 1301 to the first node 1304. The scan request 1301 cause the first node 1304 to send a directed probe request 1303 (or broadcast) to actively probe for a first intermediate reference object 1310. In response to the directed probe request 1303, the first node 1304 receives a probe response 1305 and sends a scan response 1307 to the cloud-computing system 1302. Similarly, the cloud-computing system 1302 can send a scan request 1309 to the second node 1306 and a scan request 1311 to the third node 1308.

Figure 14:
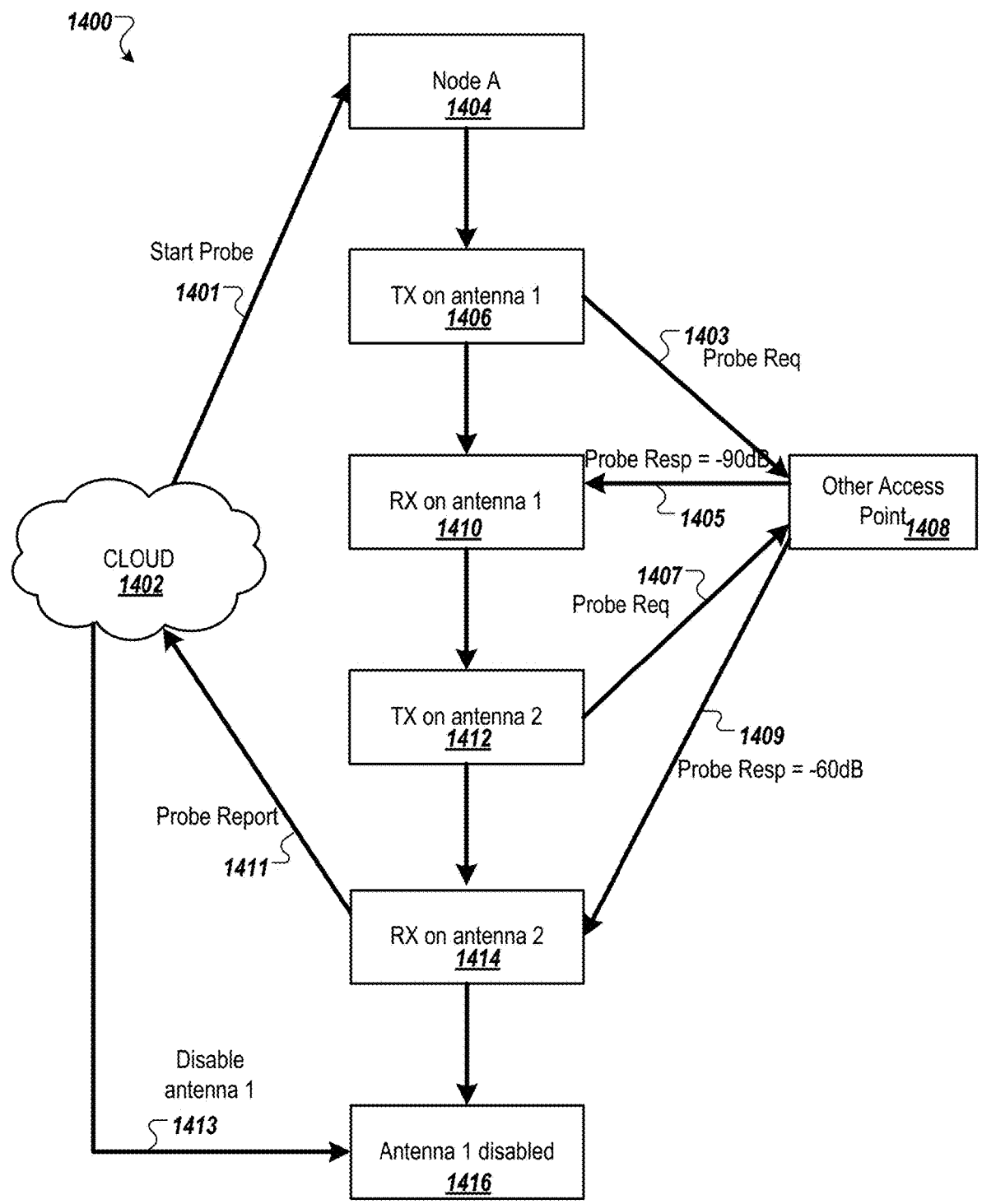
FIG. 14 is a flow diagram of an antenna detection process between a cloud-computing system, a node, and an intermediate reference object according to one embodiment.

In the case where probe requests (directed or broadcast) are used to actively probe for intermediate reference objects, the cloud-computing system can instruct the first node (or second node) to transmit the probe requests and receive the probe responses from each of antennas, such as illustrated in FIG. 14.

FIG. 14 is a flow diagram of an antenna detection process 1400 between a cloud-computing system 1402, a node 1404, and an intermediate reference object 1408 according to one embodiment. The cloud-computing system 1402 sends a start probe request 1401 to the first node 1404. The start probe request 1401 cause the first node 1404 to send a first directed probe request 1403 (or broadcast), via a first antenna (at block 1406), to actively probe for the intermediate reference object 1408. In response to the first directed probe request 1403, the intermediate reference object 1408, such an access point (AP), sends a first probe response 1405 to the first node 1404, via the first antenna (at block 1410). The first probe response 1405 can include a RSSI value (e.g., −90 dB), indicative of a signal strength of the first directed probe request 1403. The first node 1402 can send a second directed probe request 1407 (or broadcast), via a second antenna (at block 1412), to actively probe for the intermediate reference object 1408. In response to the second directed probe request 1407, the intermediate reference object 1408 sends a second probe response 1409 to the first node 1404, via the second antenna (at block 1414). The second probe response 1409 can include a RSSI value (e.g., −60 dB), indicative of a signal strength of the second directed probe request 1407. The first node 1404 can respond to the start probe request 1401 by sending a probe report 1411 to the cloud-computing system 1402. The cloud-computing system 1402 can determine that antenna 1 is disconnected from the probe report 1411 and can send a command 1413 to the first node 1404 to disable the first antenna (at block 1416).

Figure 15:
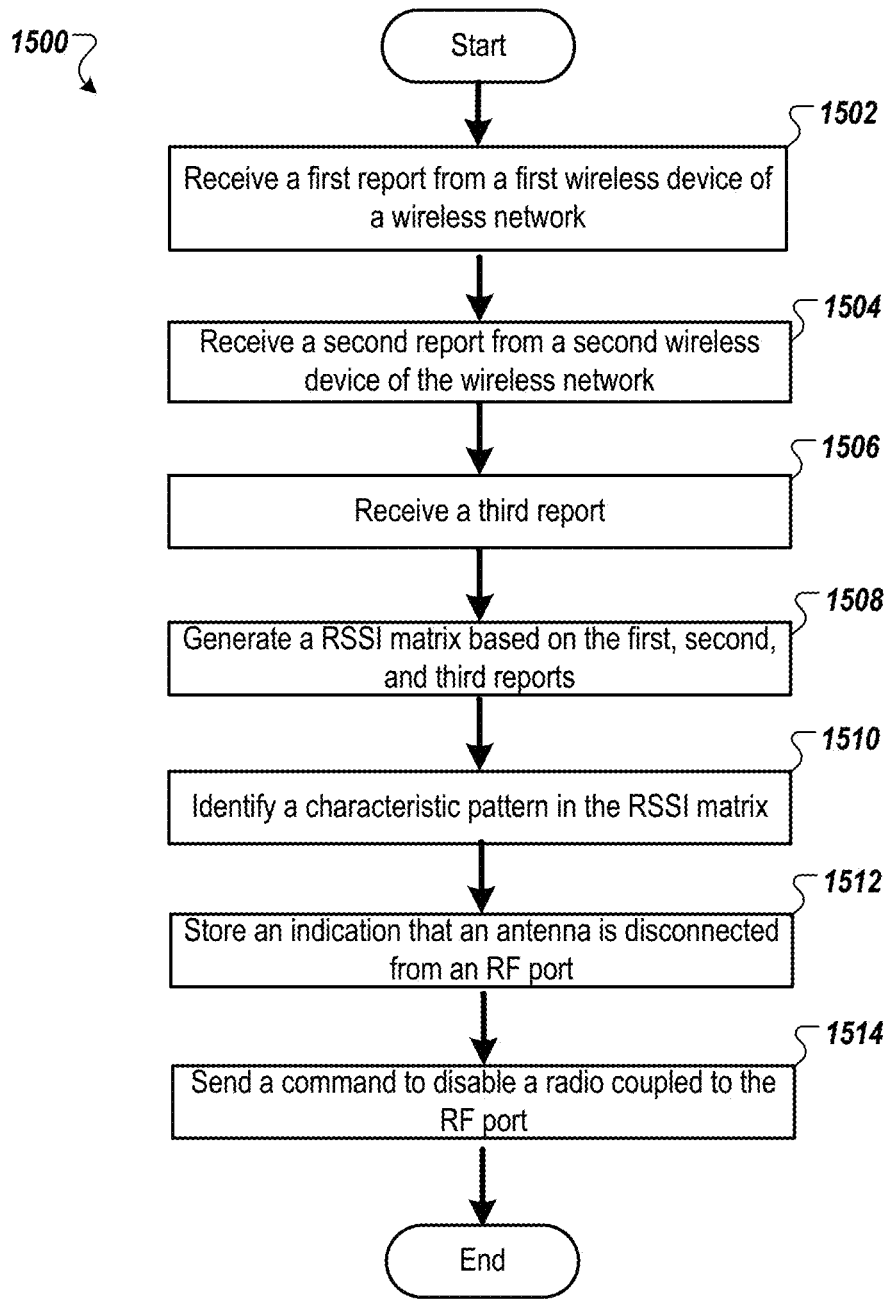
FIG. 15 is a flow diagram of a method of determining a disconnected-antenna condition according to one embodiment.

FIG. 15 is a flow diagram of a method 1500 of determining a disconnected-antenna condition according to one embodiment. The method 1500 may be performed by processing logic that comprises hardware (e.g., circuitry, dedicated logic, programmable logic, microcode, etc.), software, firmware, or a combination thereof. In one embodiment, the method 1500 may be performed by any of the processing device devices described herein and illustrated with respect to FIGS. 1-14.

Referring back to FIG. 15, the method 1500 begins by the processing logic receiving a first report from a first wireless device of a wireless network (block 1502). The first report includes a first RSSI value that is measured at a first RF port of the first wireless device and is indicative of a signal strength of a respective link between the first RF port and a second RF port of a second wireless device in the wireless network. The processing logic receives a second report from a second wireless device of the wireless network (block 1504). The second report includes a second RSSI value that is measured at the second RF port of the second wireless device and is indicative of a signal strength of a respective link between the second RF port and the first RF port. The processing logic receives a third report (block 1506). The third report can originate from the second wireless device or a third wireless device as described herein. The third report includes a third RSSI value that is measured at a third RF port and is indicative of a signal strength of a respective link between the third RF port and a fourth RF port. The processing logic generates a RSSI matrix based on at least the first report, the second report, and the third report (block 1508). In one embodiment, a first row is associated with a first RF port identifier of the first RF port and includes i) a first element having the first RSSI value, ii) a second element having a fourth RSSI value corresponding to a respective link between the first RF port and the third RF port, and iii) a third element having a fifth RSSI value corresponding to a respective link between the first RF port and the fourth RF port. A second is associated with a second RF port identifier of the second RF port and includes i) a first element having the second RSSI value, ii) a second element having a sixth RSSI value corresponding to a respective link between the second RF port and the third RF port, and iii) a third element having a seventh RSSI value corresponding to a respective link between the second RF port and the fourth RF port. A third row is associated with a third RF port identifier of the third RF port and includes i) a first element having the third RSSI value, ii) a second element having an eighth RSSI value corresponding to a respective link between the third RF port and the first RF port, and iii) a third element having a ninth RSSI value corresponding to a respective link between the third RF port and the second RF port. A first column corresponds to the first RF port, a second column corresponds to the second RF port, a third column corresponds to the third RF port, and a fourth column corresponds to the fourth RF port, such as illustrated in Table 5:

TABLE 5

Sample RSSI Matrix

| RF port ID | RF1 (TX) | RF2 | RF3 | RF4 (TX) |
|---|---|---|---|---|
| RF1 (RX) (1$^{st}$ device) | n/a | RSSI1 (first report) | RSSI4 | RSSI5 |
| RF2 (RX) (2$^{nd}$ device) | RSSI2 (second report) | n/a | RSSI6 | RSSI7 |
| RF3 (RX) (2$^{nd}$ or 3$^{rd}$ device) | RSSI8 | RSSI9 | n/a | RSSI3 (third report) |
| RF4 (RX) | | | | N/a |

At block 1510, the processing logic identifies a characteristic pattern in the RSSI matrix by comparing each RSSI value in the RSSI matrix against a threshold value. The characteristic pattern includes i) two or more elements in a same row having an RSSI value that does not exceed the threshold value and ii) two or elements in a same column having an RSSI value that does not exceed the threshold value. The processing logic stores an indication that an antenna is disconnected from an RF port (block 1512). The indication includes an RF port identifier corresponding to the same row and the same column of the characteristic pattern. The processing logic sends a first command to the second wireless device (block 1514); and the method 1500 ends. For example, the second wireless device includes a first radio that is coupled to the RF port of the second wireless device. The first command causes the second wireless device to disable the first radio of the second wireless device.

In a further embodiment, the processing logic receives one or more reports includes the fourth RSSI value, the fifth RSSI value, the sixth RSSI value, the seventh RSSI value, the eighth RSSI value, and the ninth RSSI value and receives one or more reports includes a tenth RSSI value corresponding to a respective link between the fourth RF port and the first RF port, an eleventh RSSI value corresponding to a respective link between the fourth RF port and the second RF, and a twelfth RSSI value corresponding to a respective link between the fourth RF port and the third RF port, such as illustrated as Table 6:

TABLE 6

Sample RSSI Matrix

| RF port ID | RF1 (TX) | RF2 | RF3 | RF4 (TX) |
|---|---|---|---|---|
| RF1 (RX) (1$^{st}$ device) | n/a | RSSI1 (first report) | RSSI4 | RSSI5 |
| RF2 (RX) (2$^{nd}$ device) | RSSI2 (second report) | n/a | RSSI6 | RSSI7 |
| RF3 (RX) (2$^{nd}$ or 3$^{rd}$ device) | RSSI8 | RSSI9 | n/a | RSSI3 (third report) |
| RF4 (RX) | RSSI10 | RSSI11 | RSSI12 | N/a |

In another embodiment, the processing logic receives a RSSI value for each transmitter-receiver pair that includes an RF port of the first wireless device, receives a RSSI value for each transmitter-receiver pair that includes an RF port of the second wireless device, and receives a RSSI value for each transmitter-receiver pair that includes an RF port of the third wireless device. In another embodiment, the processing logic receives the first RSSI value and a fourth RSSI value that is measured at the second RF port of the first wireless device and is indicative of a signal strength of a fourth link between the first RF port of the second wireless device and a second RF port of the first wireless device. The RSSI values of each of the transmit-receiver pairs can be collected from the wireless devices in the wireless network.

In a further embodiment, the processing logic receives the third report from the second wireless device includes the second RF port and the third RF port, such as illustrated as Table 7:

TABLE 7

Sample RSSI Matrix

| RF port ID | RF1 (TX) | RF2 | RF3 | RF4 (TX) |
|---|---|---|---|---|
| RF1 (RX) (1$^{st}$ device) | n/a | RSSI1 (first report) | RSSI4 | RSSI5 |
| RF2 (RX) (2$^{nd}$ device) | RSSI2 (second report) | n/a | RSSI6 | RSSI7 |
| RF3 (RX) (2$^{nd}$ device) | RSSI8 | RSSI9 | n/a | RSSI3 (third report) |
| RF4 (RX) | | | | N/a |

In a further embodiment, the first report further includes the fourth RSSI value, the fifth RSSI value, or both. The second report further includes the sixth RSSI value, the seventh RSSI value, or both. The third report further includes eighth RSSI value, the ninth RSSI value, or both. The processing logic receives a fourth report includes a tenth RSSI value corresponding to a respective link between the fourth RF port and the first RF port, an eleventh RSSI value corresponding to a respective link between the fourth RF port and the second RF, and a twelfth RSSI value corresponding to a respective link between the fourth RF port and the third RF port, such as illustrated in Table 8:

TABLE 8

Sample RSSI Matrix

| RF port ID | RF1 (TX) | RF2 | RF3 | RF4 (TX) |
|---|---|---|---|---|
| RF1 (RX)<br>(1st device) | n/a | RSSI1<br>(first report) | RSSI4<br>(first report) | RSSI5<br>(first report) |
| RF2 (RX)<br>(2nd device) | RSSI2<br>(second report) | n/a | RSSI6<br>(second report) | RSSI7<br>(second report) |
| RF3 (RX)<br>(2nd or 3rd device) | RSSI8<br>(third report) | RSSI9<br>(third report) | n/a | RSSI3<br>(third report) |
| RF4 (RX) | RSSI10<br>(fourth report) | RSSI11<br>(fourth report) | RSSI12<br>(fourth report) | N/a |

In a further embodiment, the processing logic determines a first physical distance between the first RF port and the second RF port and a second physical distance between the first RF port and the third RF port. The processing logic normalizes the first element of the first row by applying a first RSSI offset, corresponding to the first physical distance, to the first RSSI value. The processing logic normalizes the second element of the first row by applying a second RSSI offset, corresponding to the second physical distance, to the fourth RSSI value. In another embodiment, the processing logic determines a physical distance between each combination of two RF ports for each of the first RF port, the second RF port, the third RF port, and the fourth RF port. The processing logic normalizes each element in the RSSI matrix by adjusting a respective RSSI value by an RSSI offset corresponding to the respective physical distance between the respective combinations of two RF ports. In another embodiment, the processing logic determines a first physical distance between the first wireless device and the second wireless device, determines a second physical distance between the second wireless device and the third wireless device, and determines a third physical distance between the first wireless device and the third wireless device. The processing logic normalizes the first RSSI value by adding or subtracting a first RSSI offset, corresponding to the first physical distance, to or from the first RSSI value. The processing logic normalizes the second RSSI value by adding or subtracting a second RSSI offset, corresponding to the second physical distance, to or from the second RSSI value. The processing logic normalizes the third RSSI value by adding or subtracting a third RSSI offset, corresponding to the third physical distance, to or from the third RSSI value. In other embodiments, other normalization parameters can be used to normalize the RSSI matrix. For example, transmit power, cable variations (e.g., cable related losses), antenna gains, time of arrival, or other parameters can be used in a similar manner as physical distances as described herein.

In one embodiment, the processing logic determines a physical distance, such as the first physical distance, by calculating the first physical distance between a first GPS coordinate of the first RF port and a second GPS coordinate of the second RF port. In another embodiment, the processing logic determines a physical distance, such as the first physical distance, using a TOF measurement of an amount of time it takes data to travel from the second RF port to the first RF port. In another embodiment, the processing logic calculates a first physical distance between a first GPS coordinate of the first wireless device and a second GPS coordinate of the second wireless device. In another embodiment, the processing logic calculates the first physical distance using a TOF measurement of an amount of time it takes data to travel between the first wireless device and the second wireless device.

In another embodiment, the processing logic identifies the characteristic pattern at block 1510 by identifying a characteristic cross in which: i) most or all RSSI values in the same row has an RSSI value that does not exceed the threshold value; and ii) most or all RSSI values in the same column has an RSSI value that does not exceed the threshold value. The processing logic can identify the RF port identifier corresponding to the same row and the same column of the characteristic cross. In one embodiment, the processing logic identifies the characteristic pattern in the RSSI matrix by performing a correlation function with a signal pattern that represents a disconnected antenna at an RF port. The correlation function outputs correlation coefficients for each RF port identifier of the RSSI matrix. The processing logic determines that the RF port identifier has a correlation coefficient that exceeds a threshold value, the threshold value representing a match with the signal pattern. The processing logic causes the first indication to be stored with the RF port identifier. In another embodiment, the processing logic identifies the characteristic pattern in the RSSI matrix by comparing each RSSI value in the RSSI matrix against a threshold value that represents a minimum RSSI value for a wireless link. The processing logic determines that a single row and a single column corresponding to the RF port identifier has i) two or more elements having an RSSI value that does not exceed the threshold value and ii) two or more elements in a same column having an RSSI value that does not exceed the threshold value. The processing logic causes the first indication to be stored with the RF port identifier.

In one embodiment, the processing logic identifies the characteristic pattern in the RSSI matrix by performing a correlation function with a signal pattern that represents a disconnected antenna at an RF port. The correlation function outputs correlation coefficients for each RF port identifier of the RSSI matrix. The processing logic determines that the RF port identifier has a correlation coefficient that exceeds a threshold value, the threshold value representing a match with the signal pattern. The processing logic causes a first indication that an antenna is disconnected from the RF port of the second wireless device to be stored, the first indication comprises the first RF port identifier corresponding to the same row and same column.

In another embodiment, the processing logic performs a correlation function with an antenna disconnected signal. The antenna disconnected signal are the expected values in a cross pattern where the RSSI values are below a threshold value, such as −95 dBm. The correlation function compares the antenna disconnected signal with the second matrix to obtain a correlation output that indicates a first characteristic pattern. As illustrated in FIG. 6B, the correlation output can be a cross-correlation diagonal that shows which correlation coefficients are greater than a detection threshold value.

In another embodiment, the processing logic identifies a second characteristic cross pattern in the RSSI matrix. The second characteristic cross includes i) two or more elements in a second same row having an RSSI value that does not exceed the threshold value and ii) two or elements in a second same column having an RSSI value that does not exceed the threshold value. The processing logic stores a second indication that a second antenna is disconnected from a second RF port, the first indication includes another RF port identifier corresponding to the second same row and the second same column. The processing logic sends a second command to a third device, the third device including the second RF port and a second radio coupled to the second RF port. The second command causes the third device to disable the second radio.

Figure 16:
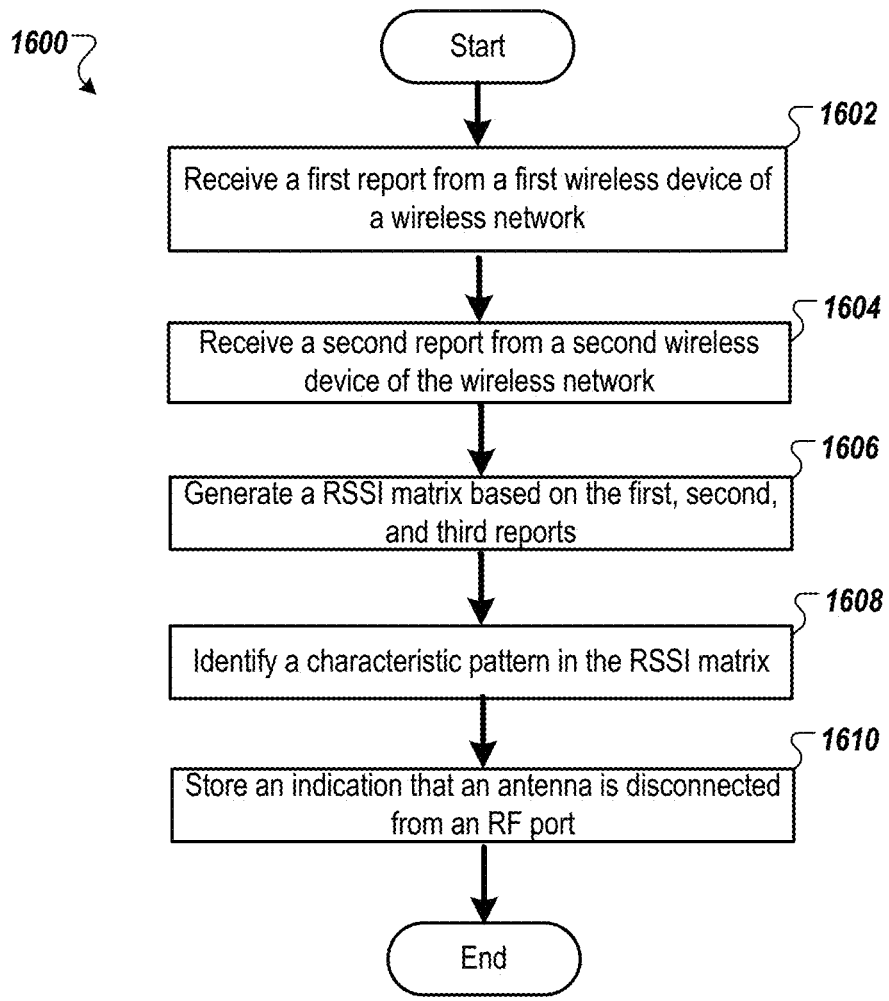
FIG. 16 is a flow diagram of a method of determining a disconnected-antenna condition using a wireless device with two concurrent radios according to one embodiment.

FIG. 16 is a flow diagram of a method of determining a disconnected-antenna condition using a wireless device with two concurrent radios according to one embodiment. The method 1600 may be performed by processing logic that comprises hardware (e.g., circuitry, dedicated logic, programmable logic, microcode, etc.), software, firmware, or a combination thereof. In one embodiment, the method 1600 may be performed by any of the processing device devices described herein and illustrated with respect to FIGS. 1-14.

Referring back to FIG. 16, the method 1600 begins by the processing logic receiving a first report from a first wireless device of a wireless network (block 1602). The first report comprising i) a first RSSI value that is measured at a first RF port of the first wireless device and is indicative of a signal strength of a respective link between the first RF port and a third RF port of a second wireless device in the wireless network, and ii) a second RSSI value that is measured at a second RF port of the first wireless device and is indicative of a signal strength of a respective link between the second RF port and the third RF port of the second wireless device. The processing logic receives a second report from the second wireless device of the wireless network (block 1604). The second report includes at least one of i) a third RSSI value that is measured at the third RF port and is indicative of a signal strength of a respective link between the third RF port and the first RF port, or ii) a fourth RSSI value that is measured at the third RF port and is indicative of a signal strength of a respective link between the third RF port and the second RF port. The processing logic generates a RSSI matrix based on the first and second reports (block 1606).

In one embodiment, a first row of the RSSI matrix is associated with a first RF port identifier of the first RF port and includes i) a first element having the first RSSI value, and ii) a second element having a fifth RSSI value measured at the first RF port and is indicative of a signal strength between the first RF port and the second RF port. A second row is associated with a second RF port identifier of the second RF port and includes i) a first element having the second RSSI value, and ii) a second element having a sixth RSSI value measured at the second RF port and is indicative of a signal strength between the second RF port and the first RF. A third row is associated with a third RF port identifier of the third RF port and includes i) a first element having the third RSSI value, and ii) a second element having the fourth RSSI value. A first column corresponds to the first RF port, a second column corresponds to the second RF port, a third column corresponds to the third RF port, such as illustrated in Table 9:

TABLE 9

Sample RSSI Matrix

| RF port ID | RF1 (TX) | RF2 | RF3 |
|---|---|---|---|
| RF1 (RX) (1st device) | n/a | RSSI5 (no report) | RSSI1 (first report) |
| RF2 (RX) (1st device) | RSSI6 (no report) | n/a | RSSI2 (first report) |
| RF3 (RX) (2nd device) | RSSI3 (second report) | RSSI4 (second report) | n/a |

Referring back to FIG. 16, the processing logic identifies a characteristic pattern in the RSSI matrix by comparing each RSSI value in the RSSI matrix against a threshold value (block 1608). The characteristic pattern includes i) two or more elements in the second row having an RSSI value that does not exceed the threshold value and ii) two or elements in the second column having an RSSI value that does not exceed the threshold value. The processing logic stores an indication that an antenna is disconnected from an RF port (block 1610), such as second antenna being disconnected from a second RF port. The indication includes a RF port identifier, such as the second RF port identifier corresponding to the second row.

In a further embodiment, the processing logic receives one or more reports including a seventh RSSI value measured at the first RF port and is indicative of a signal strength between the first RF port and a fourth port of a third device, an eighth RSSI value measured at the second RF port and is indicative of a signal strength between the second RF port and the fourth RF port, and a ninth RSSI value measured at the third RF port and is indicative of a signal strength between the third RF port and the fourth RF port. The processing logic can receive from the third device, one or more reports comprising a tenth RSSI value measured at the fourth RF port and is indicative of a signal strength between the fourth RF port and the first RF port, a eleventh RSSI value measured at the fourth RF port and is indicative of a signal strength between the fourth RF port and the second RF port, and a twelfth RSSI value measured at the fourth RF port and is indicative of a signal strength between the fourth RF port and the third RF port. The RSSI matrix includes a fourth row that is associated with a fourth RF port identifier of the fourth RF port and includes i) a first element having the tenth RSSI value, ii) a second element having the eleventh RSSI value, and iii) a third element having the twelfth RSSI value, wherein a fourth column of the plurality of columns corresponds to the fourth RF port, such as illustrated in Table 10:

TABLE 10

Sample RSSI Matrix

| RF port ID | RF1 (TX) | RF2 | RF3 | RF4 (TX) |
|---|---|---|---|---|
| RF1 (RX) (1st device) | n/a | RSSI5 (additional report) | RSSI1 (first report) | RSSI7 (additional report) |
| RF2 (RX) (1st device) | RSSI6 (additional report) | n/a | RSSI2 (first report) | RSSI8 (additional report) |
| RF3 (RX) (2nd device) | RSSI3 (second report) | RSSI4 (second report) | n/a | RSSI9 (additional report) |
| RF4 (RX) (2nd) | RSSI10 (additional report) | RSSI11 (additional report) | RSSI12 (additional report) | N/a |

In a further embodiment, the processing logic receives a third report from the second wireless device that includes the third RF port and a fourth RF port (i.e. co-located radios). The third report includes a seventh RSSI value measured at the fourth RF port and is indicative of a signal strength between the fourth RF port and the first RF port, an eighth RSSI value measured at the fourth RF port and is indicative of a signal strength between the fourth RF port and the second RF port, and a ninth RSSI value measured at the fourth RF port and is indicative of a signal strength between the fourth RF port and the third RF port. The RSSI matrix includes a fourth row that is associated with a fourth RF port identifier of the fourth RF port and includes i) a first element having the seventh RSSI value, ii) a second element having the eighth RSSI value, and iii) a third element having the ninth RSSI value, such as illustrated in Table 11:

TABLE 11

Sample RSSI Matrix

| RF port ID | RF1 (TX) | RF2 | RF3 | RF4 (TX) |
|---|---|---|---|---|
| RF1 (RX) (1st device) | n/a | RSSI5 (additional report) | RSSI1 (first report) | Empty |
| RF2 (RX) (1st device) | RSSI6 (additional report) | n/a | RSSI2 (first report) | Empty |
| RF3 (RX) (2nd device) | RSSI3 (second report) | RSSI4 (second report) | n/a | Empty? |
| RF4 (RX) (2nd) | RSSI7 (3rd report) | RSSI8 (3rd report) | RSSI9 (3rd report) | N/a |

In a further embodiment, the processing logic receives a third report from a third wireless device that includes a fourth RF port (third and fourth RF ports are in separate devices). The third report includes a seventh RSSI value measured at the fourth RF port and is indicative of a signal strength between the fourth RF port and the first RF port, an eighth RSSI value measured at the fourth RF port and is indicative of a signal strength between the fourth RF port and the second RF port, and a ninth RSSI value measured at the fourth RF port and is indicative of a signal strength between the fourth RF port and the third RF port. The RSSI matrix includes a fourth row that is associated with a fourth RF port identifier of the fourth RF port and includes i) a first element having the seventh RSSI value, ii) a second element having the eighth RSSI value, and iii) a third element having the ninth RSSI value, such as illustrated in Table 12.

TABLE 12

Sample RSSI Matrix

| RF1 (RX) (1st device) | n/a | RSSI5 (additional report) | RSSI1 (first report) | Empty |
|---|---|---|---|---|
| RF2 (RX) (1st device) | RSSI6 (additional report) | n/a | RSSI2 (first report) | Empty |
| RF3 (RX) (2nd device) | RSSI3 (second report) | RSSI4 (second report) | n/a | Empty |
| RF4 (RX) (3rd) | RSSI7 (3rd report) | RSSI8 (3rd report) | RSSI9 (3rd report) | N/a |

In another embodiment, the processing logic receives a first data from a first wireless device of a wireless network, the first data including i) a first receive signal strength indicator (RSSI) value that is measured at a first radio frequency (RF) port of the first wireless device and is indicative of a signal strength of a respective link between the first RF port and a first RF port of a second wireless device in the wireless network, and ii) a second RSSI value that is measured at a second RF port of the first wireless device and is indicative of a signal strength of a respective link between the second RF port and a second RF port of the second wireless device. The processing logic receives second data from the second wireless device of the wireless network, the second data comprising at least one of i) a third RSSI value that is measured at the first RF port of the second wireless device, or ii) a fourth RSSI value that is measured at the second RF port of the second wireless device. The processing logic generates a RSSI matrix comprising a plurality of elements each storing an RSSI value indicative of a signal strength of a wireless link between a transmitter-receiver pair. The processing logic identifies a characteristic pattern in the RSSI matrix, wherein the characteristic pattern comprises i) two or more elements in the second row having an RSSI value that does not exceed a threshold value and ii) two or more elements in the second column having an RSSI value that does not exceed the threshold value. The processing logic sends a first command to the second wireless device, the first command causing the second wireless device to disable a radio coupled to a RF port associated with an RF port identifier corresponding to the same row and the same column.

In a further embodiment, the processing logic receives a RSSI value for each transmitter-receiver pair that includes an RF port of the first wireless device and a RSSI value for each transmitter-receiver pair that includes an RF port of the second wireless device. In another embodiment, the processing logic receives third data from a third second wireless device of the wireless network, the third data including at least one of i) a fifth RSSI value that is measured at a first RF port of the third wireless device, or ii) a sixth RSSI value that is measured at a second RF port of the third wireless device.

In a further embodiment, the processing logic generates the RSSI matrix by determining, by the remote server, a first physical distance between the first RF port and the third RF port and a second physical distance between the first RF port and a fourth RF port of a third wireless device. The processing logic can determine a physical distance for each element in the RSSI matrix. The processing logic normalizes the first element of the first row by applying a first RSSI offset, corresponding to the first physical distance, to a first RSSI value at the first element. The processing logic normalizes the second element of the first row by applying a second RSSI offset, corresponding to the second physical distance to a second RSSI value at the second element. The processing logic can normalize each element by a corresponding RSSI offset that adjusts for the respective physical distance. In one embodiment, the processing logic determines the physical distance by calculating a difference between a first GPS coordinate of the first RF port and a second GPS coordinate of the third RF port. In another embodiment, the processing logic determines the physical distance by using a TOF measurement of an amount of time it takes data to travel from the third RF port to the first RF port. The GPS coordinates of other RF ports or TOF measurements between each pair of RF ports can be used to determine a respective physical distance between a pair of RF ports.

In another embodiment, the processing logic determines a first physical distance between the first wireless device and the second wireless device. The processing logic normalizes the first RSSI value by adding or subtracting a first RSSI offset, corresponding to the first physical distance, to or from the first RSSI value. The processing logic can normalize the second RSSI value, the third RSSI value, and the fourth RSSI value in a similar fashion. In other embodiments, other normalization parameters can be used to normalize the RSSI matrix. For example, transmit power, cable variations (e.g., cable related losses), antenna gains, time of arrival, or other parameters can be used in a similar manner as physical distances as described herein.

Figure 17:
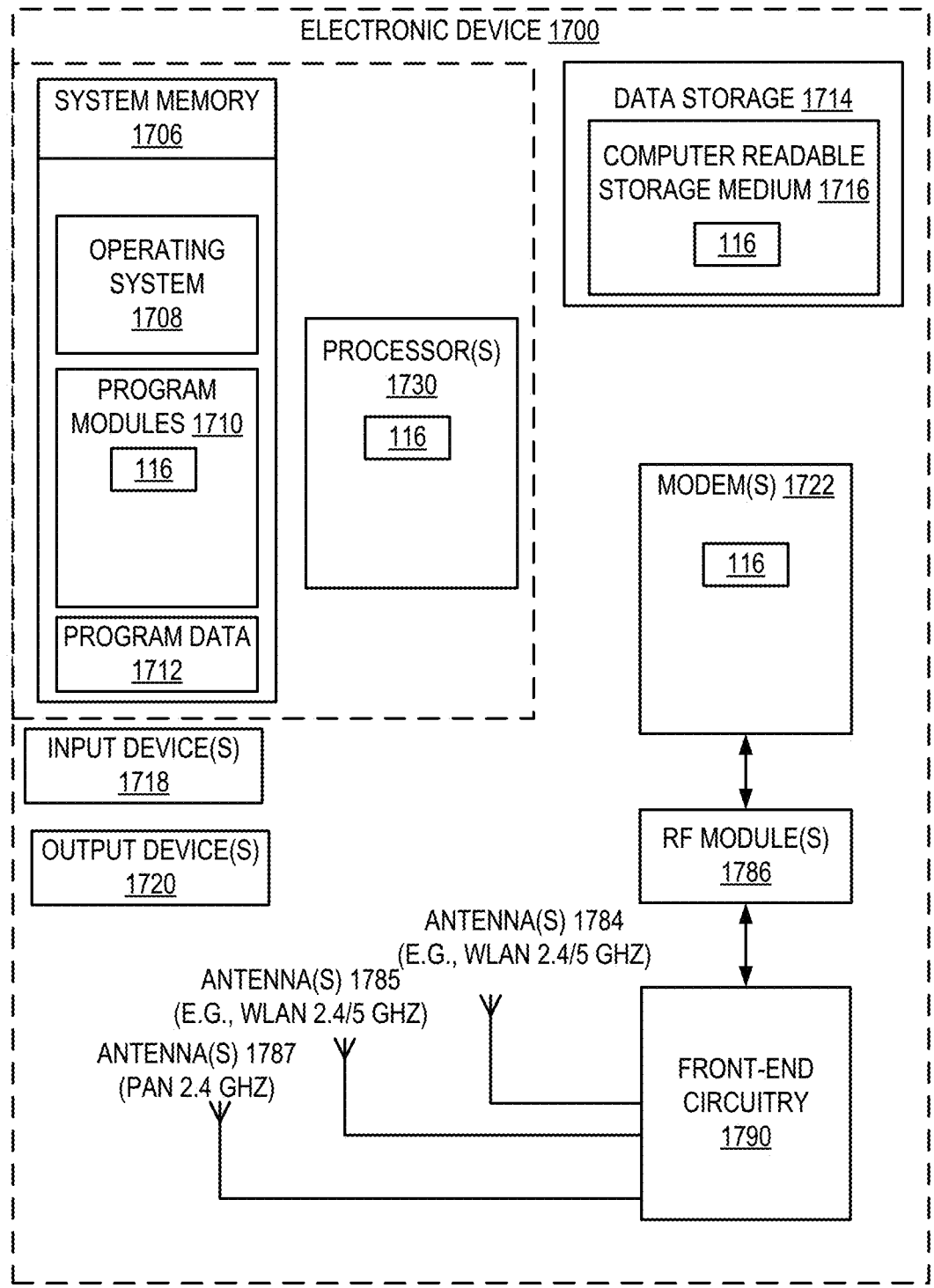
FIG. 17 is a block diagram of an electronic device that can be configured to detect a disconnected-antenna condition as described herein according to one embodiment.

FIG. 17 is a block diagram of an electronic device 1700 that can be configured to detect a disconnected-antenna condition as described herein according to one embodiment.

The electronic device 1700 may correspond to the electronic devices described above with respect to FIGS. 1-16. In one embodiment, the electronic device 1700 is the remote server 114 of FIG. 1 that implements the disconnected-antenna detection logic 116. In another embodiment, the electronic device 1700 is a remote device at the cloud-computing system, such as the cloud-computing system 1002 of FIG. 10, the cloud-computing system 1202 of FIG. 12, the cloud-computing system 1302 of FIG. 13, the cloud-computing system 1402 of FIG. 14, or the like. In another embodiment, the electronic device 1700 is a controller device for antenna disconnection detection of distributed antennas in a wireless network. The controller device can be a wireless device in the wireless network. The controller device can receive RSSI reports from other wireless device in the wireless network. In another embodiment, the electronic device 170 is a device that performs the method 1600 of FIG. 16, the method 1700 or the like. Alternatively, the electronic device 1700 may be other electronic devices, as described herein.

The electronic device 1700 includes one or more processor(s) 1730, such as one or more CPUs, microcontrollers, field programmable gate arrays, or other types of processors. The electronic device 1700 also includes system memory 1706, which may correspond to any combination of volatile and/or non-volatile storage mechanisms. The system memory 1706 stores information that provides operating system component 1708, various program modules 1710, program data 1712, and/or other components. In one embodiment, the system memory 1706 stores instructions of methods to control operation of the electronic device 1700. The electronic device 1700 performs functions by using the processor(s) 1730 to execute instructions provided by the system memory 1706. In one embodiment, the program modules 1710 may include disconnected-antenna detection logic 116 that may perform some or all of the operations described herein, such as the method 1600, the method 1700, or any combination thereof. The disconnected-antenna detection logic 116 may perform some or all of the operations described herein to detect a disconnected-antenna condition.

The electronic device 1700 also includes a data storage device 1714 that may be composed of one or more types of removable storage and/or one or more types of non-removable storage. The data storage device 1714 includes a computer-readable storage medium 1716 on which is stored one or more sets of instructions embodying any of the methodologies or functions described herein. Instructions for the program modules 1710 (e.g., disconnected-antenna detection logic 116 and RSSI based reflectometry logic 1705) may reside, completely or at least partially, within the computer-readable storage medium 1716, system memory 1706 and/or within the processor(s) 1730 during execution thereof by the electronic device 1700, the system memory 1706 and the processor(s) 1730 also constituting computer-readable media. The electronic device 1700 may also include one or more input devices 1718 (keyboard, mouse device, specialized selection keys, etc.) and one or more output devices 1720 (displays, printers, audio output mechanisms, etc.).

The electronic device 1700 further includes a modem 1722 to allow the electronic device 1700 to communicate via a wireless connections (e.g., such as provided by the wireless communication system) with other computing devices, such as remote computers, an item providing system, and so forth. The modem 1722 can be connected to one or more RF modules 1786. The RF modules 1786 may be a wireless local area network (WLAN) module, a wide area network (WAN) module, wireless personal area network (WPAN) module, GPS module, or the like. The antenna structures (antenna(s) 1784, 1785, 1787) are coupled to the front-end circuitry 1790, which is coupled to the modem 1022. The front-end circuitry 1790 may include radio front-end circuitry, antenna switching circuitry, impedance matching circuitry, or the like. The antennas 1784 may be GPS antennas, Near-Field Communication (NFC) antennas, other WAN antennas, WLAN or personal area network (PAN) antennas, or the like. The modem 1722 allows the electronic device 1700 to handle both voice and non-voice communications (such as communications for text messages, multimedia messages, media downloads, web browsing, etc.) with a wireless communication system. The modem 1722 may provide network connectivity using any type of mobile network technology including, for example, Cellular Digital Packet Data (CDPD), General Packet Radio Service (GPRS), EDGE, Universal Mobile Telecommunications System (UMTS), Single-Carrier Radio Transmission Technology (1×RTT), Evaluation Data Optimized (EVDO), High-Speed Down-Link Packet Access (HSDPA), Wi-Fi®, Long Term Evolution (LTE) and LTE Advanced (sometimes generally referred to as 4G), etc.

The modem 1722 may generate signals and send these signals to antenna(s) 1784 of a first type (e.g., WLAN 5 GHz), antenna(s) 1785 of a second type (e.g., WLAN 2.4 GHz), and/or antenna(s) 1787 of a third type (e.g., WAN), via front-end circuitry 1790, and RF module(s) 1786 as descried herein. Antennas 1784, 1785, 1787 may be configured to transmit in different frequency bands and/or using different wireless communication protocols. The antennas 1784, 1785, 1787 may be directional, omnidirectional, or non-directional antennas. In addition to sending data, antennas 1784, 1785, 1787 may also receive data, which is sent to appropriate RF modules connected to the antennas. One of the antennas 1784, 1785, 1787 may be any combination of the antenna structures described herein.

In one embodiment, the electronic device 1700 establishes a first connection using a first wireless communication protocol, and a second connection using a different wireless communication protocol. The first wireless connection and second wireless connection may be active concurrently, for example, if an electronic device is receiving a media item from another electronic device via the first connection) and transferring a file to another electronic device (e.g., via the second connection) at the same time. Alternatively, the two connections may be active concurrently during wireless communications with multiple devices. In one embodiment, the first wireless connection is associated with a first resonant mode of an antenna structure that operates at a first frequency band and the second wireless connection is associated with a second resonant mode of the antenna structure that operates at a second frequency band. In another embodiment, the first wireless connection is associated with a first antenna structure and the second wireless connection is associated with a second antenna.

Though a modem 1722 is shown to control transmission and reception via antenna (1784, 1785, 1787), the electronic device 1700 may alternatively include multiple modems, each of which is configured to transmit/receive data via a different antenna and/or wireless transmission protocol.

In the above description, numerous details are set forth. It will be apparent, however, to one of ordinary skill in the art having the benefit of this disclosure, that embodiments may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to convey the substance of their work most effectively to others skilled in the art. An algorithm is used herein, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "inducing," "parasitically inducing," "radiating," "detecting," "determining," "generating," "communicating," "receiving," "disabling," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but not limited to, any type of disk including floppy disks, optical disks, Read-Only Memories (ROMs), compact disc ROMs (CD-ROMs) and magnetic-optical disks, Random Access Memories (RAMs), EPROMs, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present embodiments are not described with reference to any particular programming language. It will be appreciated that a variety of programming languages may be used to implement the teachings of the present embodiments as described herein. It should also be noted that the terms "when" or the phrase "in response to," as used herein, should be understood to indicate that there may be intervening time, intervening events, or both before the identified operation is performed.

It is to be understood that the above description is intended to be illustrative, and not restrictive. Many other embodiments will be apparent to those of skill in the art upon reading and understanding the above description. The scope of the present embodiments should, therefore, be determined with reference to the appended claims, along with the full scope of equivalents to which such claims are entitled.

What is claimed is:

1. A method comprising:
  receiving, by a controller device, first data from a first wireless device of a wireless network, the first data comprising a first receive signal strength indicator (RSSI) value that is measured at a first radio frequency (RF) port of the first wireless device and is indicative of a signal strength of a first link between the first RF port and a first RF port of a second wireless device in the wireless network;
  receiving, by the controller device, second data from the second wireless device of the wireless network, the second data comprising a second RSSI value that is measured at a second RF port of the second wireless device and is indicative of a signal strength of a second link between the second RF port of the second wireless device and a first RF port of a third wireless device in the wireless network;
  generating, by the controller device, a RSSI matrix comprising a plurality of elements each storing an RSSI value indicative of a signal strength of a wireless link between a transmitter-receiver pair comprising the first wireless device and the second wireless device;
  identifying, by the controller device, a characteristic pattern in the RSSI matrix, wherein the characteristic pattern comprises i) two or more RSSI values in a same row not exceeding a threshold value and ii) two or more RSSI values in a same column not exceeding the threshold value;
  determining, based on the RSSI matrix, that an antenna is disconnected from an RF port of the second wireless device; and
  sending a first command to the second wireless device, the second wireless device comprising a first radio coupled to the RF port of the second wireless device, the first command causing the second wireless device to disable the first radio of the second wireless device.

2. The method of claim 1, wherein:
  receiving the first data further comprises receiving a RSSI value for each transmitter-receiver pair comprising a transmitter or a receiver of the first wireless device;
  receiving the second data further comprises receiving a RSSI value for each transmitter-receiver pair comprising a transmitter or a receiver of the second wireless device; and
  receiving a RSSI value for each transmitter-receiver pair comprising a transmitter or a receiver of the third wireless device.

3. The method of claim 1, wherein receiving the first data comprises receiving the first RSSI value and a fourth RSSI value that is measured at a second RF port of the first wireless device and is indicative of a signal strength of a fourth link between the first RF port of the second wireless device and a second RF port of the first wireless device.

4. The method of claim 1, wherein generating the RSSI matrix comprises:
  determining, by the controller device, a first physical distance between the first wireless device and the second wireless device;
  determining, by the controller device, a second physical distance between the second wireless device and the third wireless device;

determining, by the controller device, a third physical distance between the first wireless device and the third wireless device;

normalizing, by the controller device, the first RSSI value by adding or subtracting a first RSSI offset, corresponding to the first physical distance, to or from the first RSSI value;

normalizing, by the controller device, the second RSSI value by adding or subtracting a second RSSI offset, corresponding to the second physical distance, to or from the second RSSI value; and normalizing, by the controller device, a third RSSI value by adding or subtracting a third RSSI offset, corresponding to the third physical distance, to or from the third RSSI value, wherein the third RSSI value is measured at a second RF port of the third wireless device and is indicative of a signal strength of a third link between the second RF port of the third wireless device and a second RF port of the first wireless device.

5. The method of claim 4, The method of claim 4, wherein determining the first physical distance comprises calculating the first physical distance between a first global positioning system (GPS) coordinate of the first wireless device and a second GPS coordinate of the second wireless device.

6. The method of claim 4, wherein determining the first physical distance comprises calculating the first physical distance using a time of flight (TOF) measurement of an amount of time it takes data to travel between the first wireless device and the second wireless device.

7. The method of claim 1, wherein identifying the characteristic pattern in the RSSI matrix comprises identifying a characteristic cross in which: i) most or all RSSI values in the same row has an RSSI value that does not exceed the threshold value; and ii) most or all RSSI values in the same column has an RSSI value that does not exceed the threshold value, and wherein the method further comprises identifying an RF port identifier corresponding to the same row and the same column.

8. The method of claim 1, wherein identifying the characteristic pattern in the RSSI matrix comprises:
performing a correlation function with a signal pattern that represents a disconnected antenna at an RF port, wherein the correlation function outputs correlation coefficients for each RF port identifier of the RSSI matrix;
determining that an RF port identifier of the RF port of the second wireless device has a correlation coefficient that exceeds a threshold value, the threshold value representing a match with the signal pattern; and
causing a first indication to be stored with the RF port identifier.

9. The method of claim 1, wherein identifying the characteristic pattern in the RSSI matrix comprises:
comparing each RSSI value in the RSSI matrix against a threshold value that represents a minimum RSSI value for a wireless link; determining that a single row and a single column corresponding to an RF port identifier has i) two or more RSSI values not exceeding the threshold value and ii) two or more RSSI value in a same column not exceeding the threshold value; and
causing a first indication to be stored with the RF port identifier.

10. The method of claim 9, further comprising:
identifying, by the controller device, a second characteristic cross in the RSSI matrix, wherein the second characteristic cross comprises i) two or more RSSI values in a second same row not exceeding the threshold value and ii) two or more RSSI values in a second same column not exceeding the threshold value;

determining, based on the RSSI matrix, that a second indication that an antenna is disconnected from an RF port of the third wireless device; and sending a second command to a third wireless device, the third wireless device comprising a first radio coupled to the RF port of the third wireless device, the second command causing the third wireless device to disable the first radio of the second wireless device.

11. A method comprising:
receiving, by a controller device, first data from a first wireless device of a wireless network, the first data comprising i) a first receive signal strength indicator (RSSI) value that is measured at a first radio frequency (RF) port of the first wireless device and is indicative of a signal strength of a respective link between the first RF port and a first RF port of a second wireless device in the wireless network, and ii) a second RSSI value that is measured at a second RF port of the first wireless device and is indicative of a signal strength of a respective link between the second RF port and a second RF port of the second wireless device;
receiving, by the controller device, second data from the second wireless device of the wireless network, the second data comprising at least one of i) a third RSSI value that is measured at the first RF port of the second wireless device, or ii) a fourth RSSI value that is measured at the second RF port of the second wireless device;
generating, by the controller device, a RSSI matrix comprising a plurality of elements each storing an RSSI value indicative of a signal strength of a wireless link between a transmitter-receiver pair comprising the first wireless device and the second wireless device;
identifying, by the controller device, a characteristic pattern in the RSSI matrix, wherein the characteristic pattern comprises i) two or more RSSI values in a same row not exceeding a threshold value and ii) two or more RSSI values in a same column not exceeding the threshold value;
determining, based on the RSSI matrix, that an antenna is disconnected from an RF port of the second wireless device; and
sending a first command to the second wireless device, the first command causing the second wireless device to disable a radio of the second wireless device, the radio being coupled to the RF port that is disconnected from the antenna.

12. The method of claim 11, wherein:
receiving the first data further comprises receiving a RSSI value for each transmitter-receiver pair comprising a transmitter or a receiver of the first wireless device; and
receiving the second data further comprises receiving a RSSI value for each transmitter-receiver pair comprising a transmitter or a receiver of the second wireless device.

13. The method of claim 11, further comprising:
receiving, by the controller device, third data from a third second wireless device of the wireless network, the third data comprising at least one of i) a fifth RSSI value that is measured at a first RF port of the third wireless device, or ii) a sixth RSSI value that is measured at a second RF port of the third wireless device.

14. The method of claim 11, wherein generating the RSSI matrix comprises:

determining, by the controller device, a first physical distance between the first wireless device and the second wireless device;

normalizing, by the controller device, the first RSSI value by adding or subtracting a first RSSI offset, corresponding to the first physical distance, to or from the first RSSI value;

normalizing, by the controller device, the second RSSI value by adding or subtracting the first RSSI offset to or from the second RSSI value;

normalizing, by the controller device, the third RSSI value by adding or subtracting the first RSSI offset to or from the third RSSI value; and normalizing, by the controller device, the fourth RSSI value by adding or subtracting the first RSSI offset to or from the fourth RSSI value.

15. The method of claim 14, wherein determining the first physical distance comprises calculating the first physical distance between a first global positioning system (GPS) coordinate of the first wireless device and a second GPS coordinate of the second wireless device.

16. The method of claim 14, wherein determining the first physical distance comprises calculating the first physical distance using a time of flight (TOF) measurement of an amount of time it takes data to travel between the first wireless device and the second wireless device.

17. The method of claim 11, wherein identifying the characteristic pattern in the RSSI matrix comprises:

performing a correlation function with a signal pattern that represents a disconnected antenna at an RF port, wherein the correlation function outputs correlation coefficients for each RF port identifier of the RSSI matrix;

determining that the RF port identifier has a correlation coefficient that exceeds a threshold value, the threshold value representing a match with the signal pattern; and causing a first indication that an antenna is disconnected from the RF port of the second wireless device to be stored, the first indication comprises the first RF port identifier corresponding to the same row and same column.

18. A controller device for antenna disconnection detection of distributed antennas in a wireless network, the controller device comprising:

a memory device that stores a receive signal strength indicator (RSSI) matrix comprising a plurality of elements each storing an RSSI value indicative of a signal strength of a wireless link between a transmitter-receiver pair comprising a first wireless device and a second wireless device; and a processing device coupled to the memory device, wherein the processing device is configured to:

receive first data from the first wireless device of a wireless network, the first data comprising a first RSSI value that is measured at a first radio frequency (RF) port of the first wireless device and is indicative of a signal strength of a first link between the first RF port and a first RF port of the second wireless device in the wireless network;

receive second data from the second wireless device of the wireless network, the second data comprising a second RSSI value that is measured at a second RF port of the second wireless device and is indicative of a signal strength of a second link between the second RF port of the second wireless device and a first RF port of a third wireless device in the wireless network;

store the first data and the second data in the RSSI matrix;

identify a characteristic pattern in the RSSI matrix, wherein the characteristic pattern comprises i) two or more RSSI values in a same row not exceeding a threshold value and ii) two or more RSSI values in a same column not exceeding the threshold value;

determine, based on the RSSI matrix, that an antenna is disconnected from an RF port of the second wireless device; and send a first command to the second wireless device, the second wireless device comprising a first radio coupled to the RF port of the second wireless device, the first command causing the second wireless device to disable the first radio of the second wireless device.

19. The controller device of claim 18, wherein the processing device is further configured to:

receive the first data further comprises receiving a RSSI value for each transmitter-receiver pair comprising a transmitter or a receiver of the first wireless device;

receive the second data further comprises receiving a RSSI value for each transmitter-receiver pair comprising a transmitter or a receiver of the second wireless device; and receive third data further comprises receiving a RSSI value for each transmitter-receiver pair comprising a transmitter or a receiver of the third wireless device.

20. The controller device of claim 18, wherein the processing device is further configured to:

determine a first physical distance between the first wireless device and the second wireless device;

determine a second physical distance between the second wireless device and the third wireless device;

determine a third physical distance between the first wireless device and the third wireless device;

normalize the first RSSI value by adding or subtracting a first RSSI offset, corresponding to the first physical distance, to or from the first RSSI value;

normalize the second RSSI value by adding or subtracting a second RSSI offset, corresponding to the second physical distance, to or from the second RSSI value; and normalize a third RSSI value by adding or subtracting a third RSSI offset, corresponding to the third physical distance, to or from the third RSSI value, wherein the third RSSI value is measured at a second RF port of the third wireless device and is indicative of a signal strength of a third link between the second RF port of the third wireless device and a second RF port of the first wireless device.

* * * * *